March 17, 1964   O. E. EISSMANN ETAL   3,124,914
CARTON FORMING AND FILLING APPARATUS AND METHOD
Filed Sept. 26, 1960   13 Sheets-Sheet 1

INVENTORS
OSWALD E. EISSMANN
HANS G. KROHNE

BY
ATTORNEY

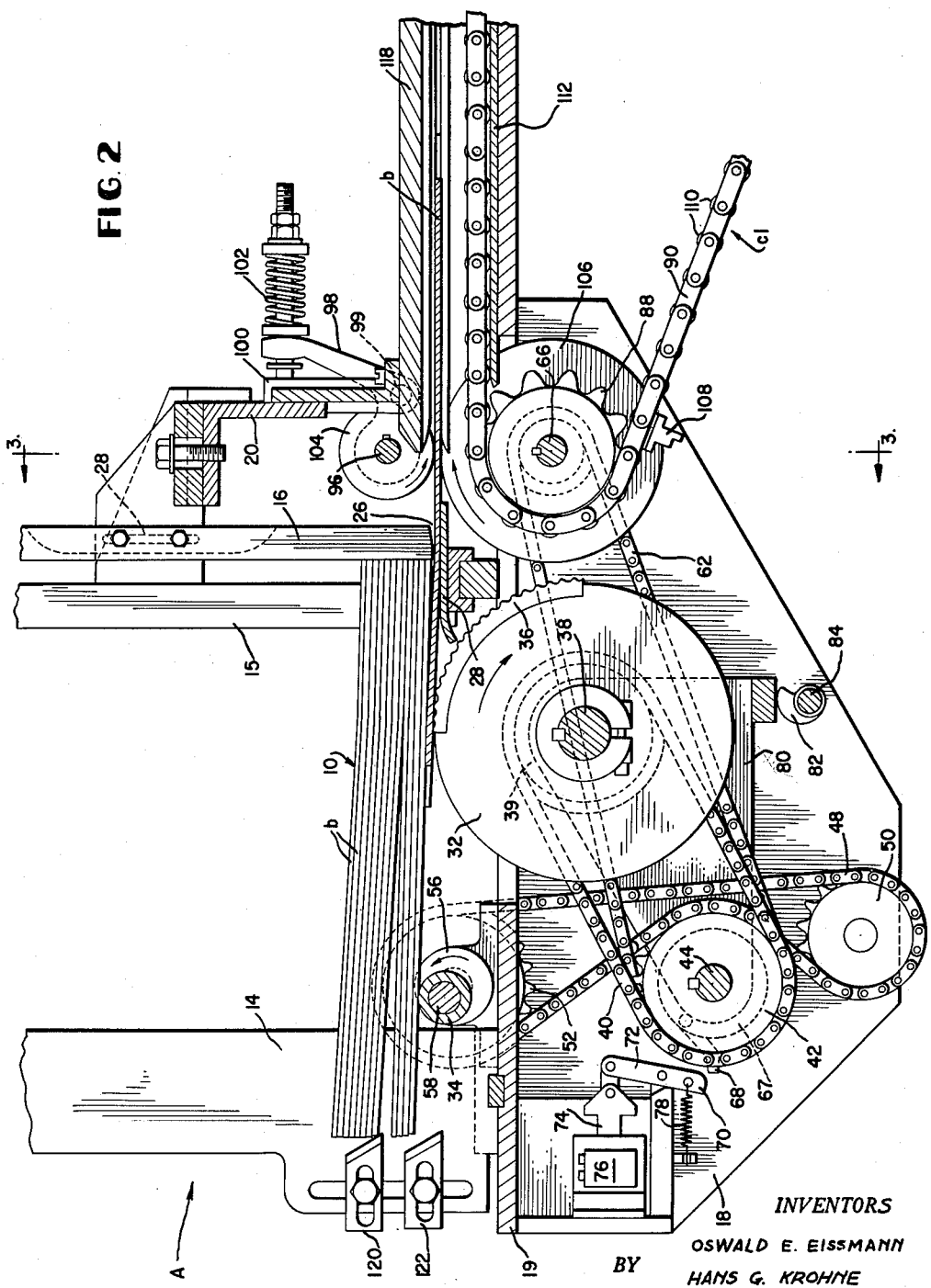

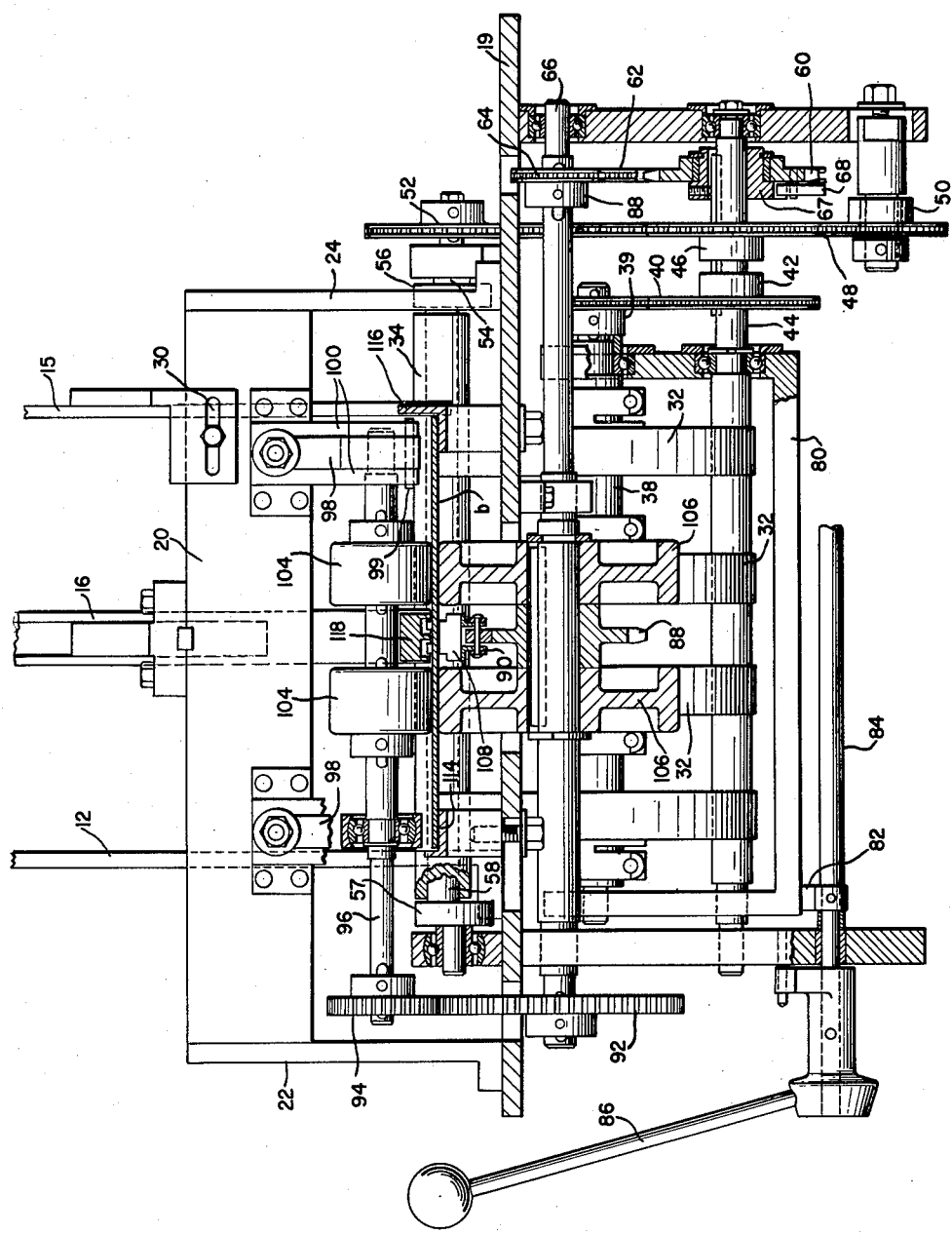

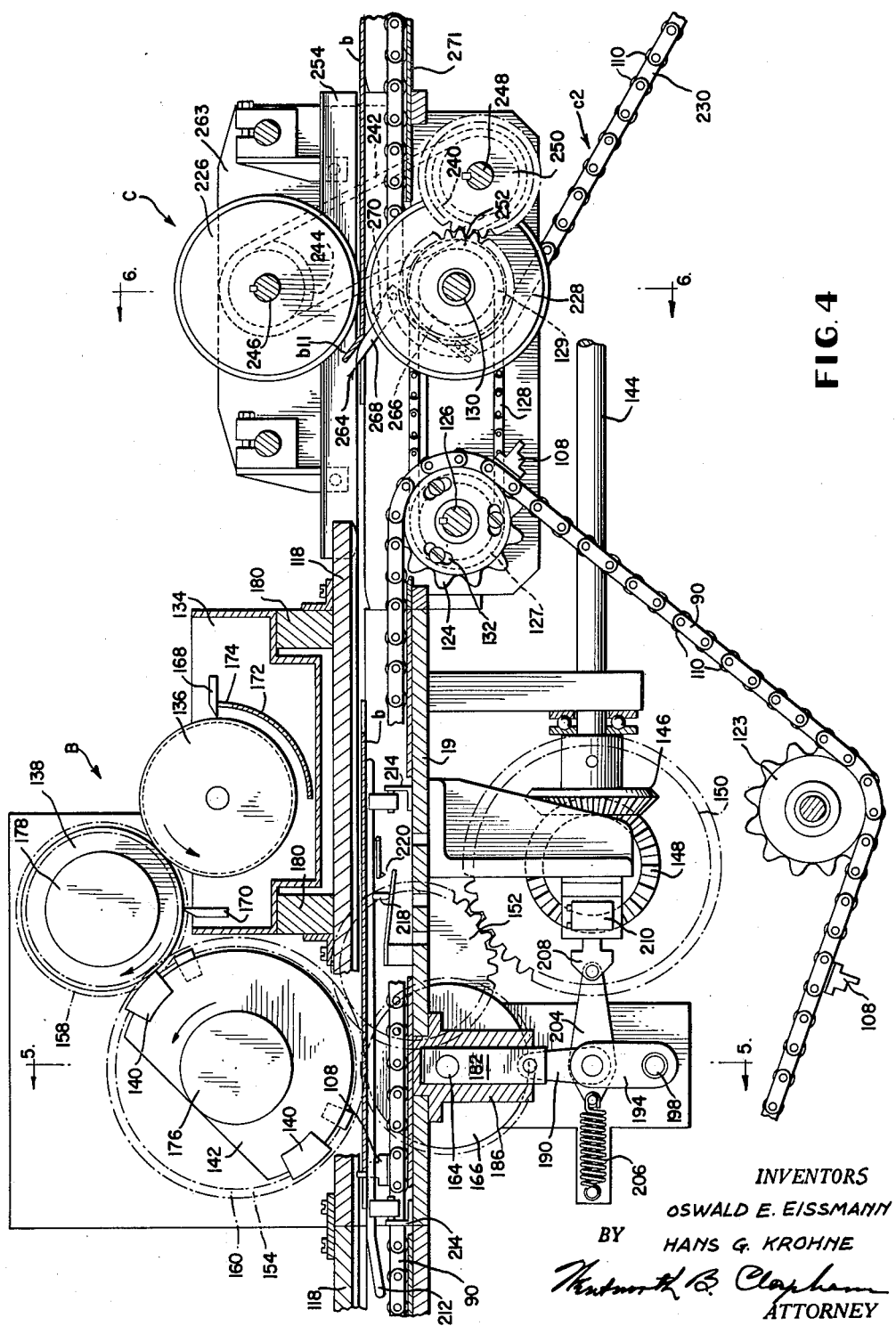

March 17, 1964 O. E. EISSMANN ETAL 3,124,914
CARTON FORMING AND FILLING APPARATUS AND METHOD
Filed Sept. 26, 1960 13 Sheets-Sheet 5
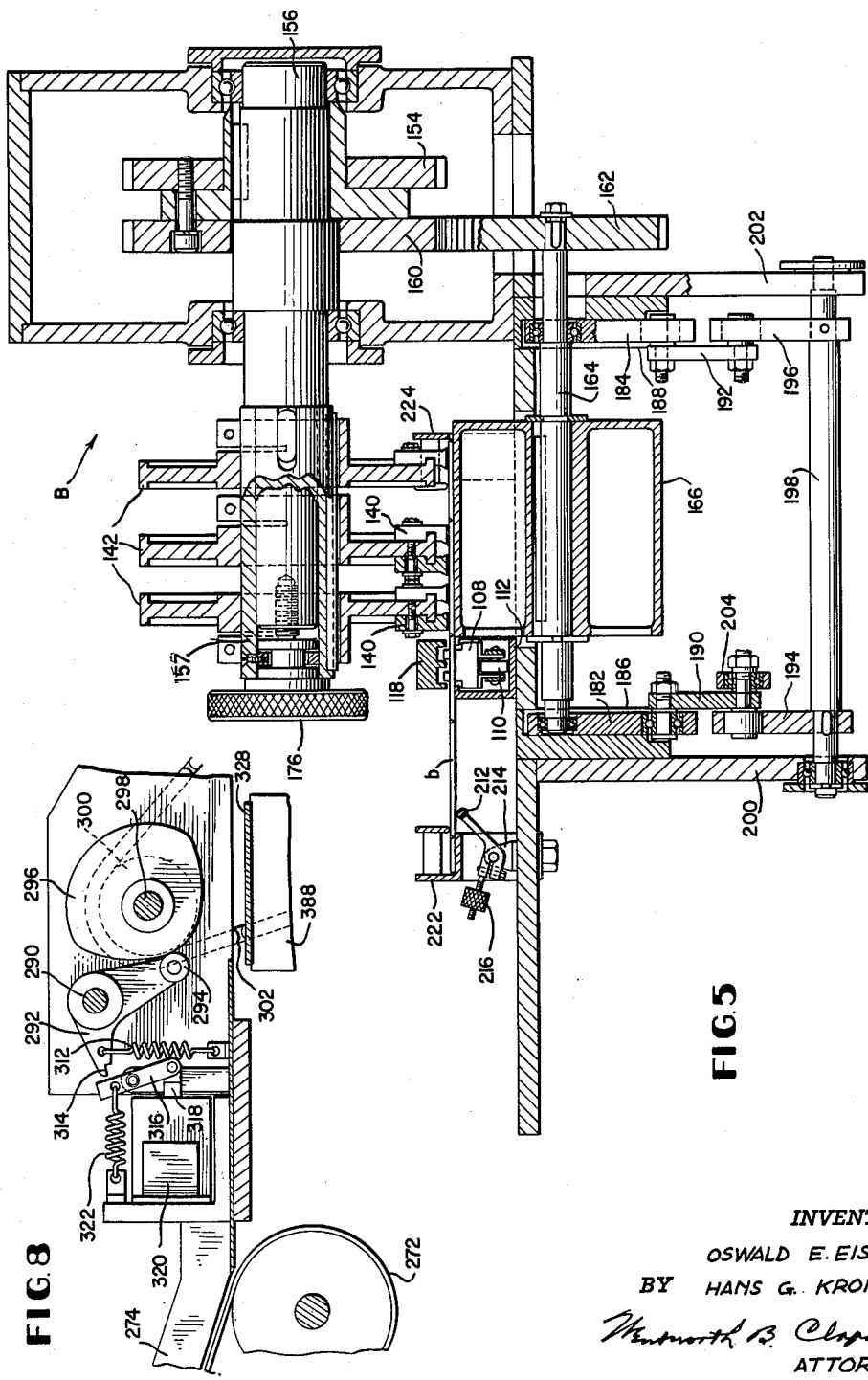
INVENTORS
OSWALD E. EISSMANN
BY HANS G. KROHNE
ATTORNEY March 17, 1964 O. E. EISSMANN ETAL 3,124,914
CARTON FORMING AND FILLING APPARATUS AND METHOD
Filed Sept. 26, 1960 13 Sheets-Sheet 6

INVENTORS
OSWALD E. EISSMANN
BY HANS G. KROHNE

ATTORNEY

March 17, 1964   O. E. EISSMANN ETAL   3,124,914
CARTON FORMING AND FILLING APPARATUS AND METHOD
Filed Sept. 26, 1960   13 Sheets-Sheet 7

INVENTORS
OSWALD E. EISSMANN
HANS G. KROHNE
BY
ATTORNEY

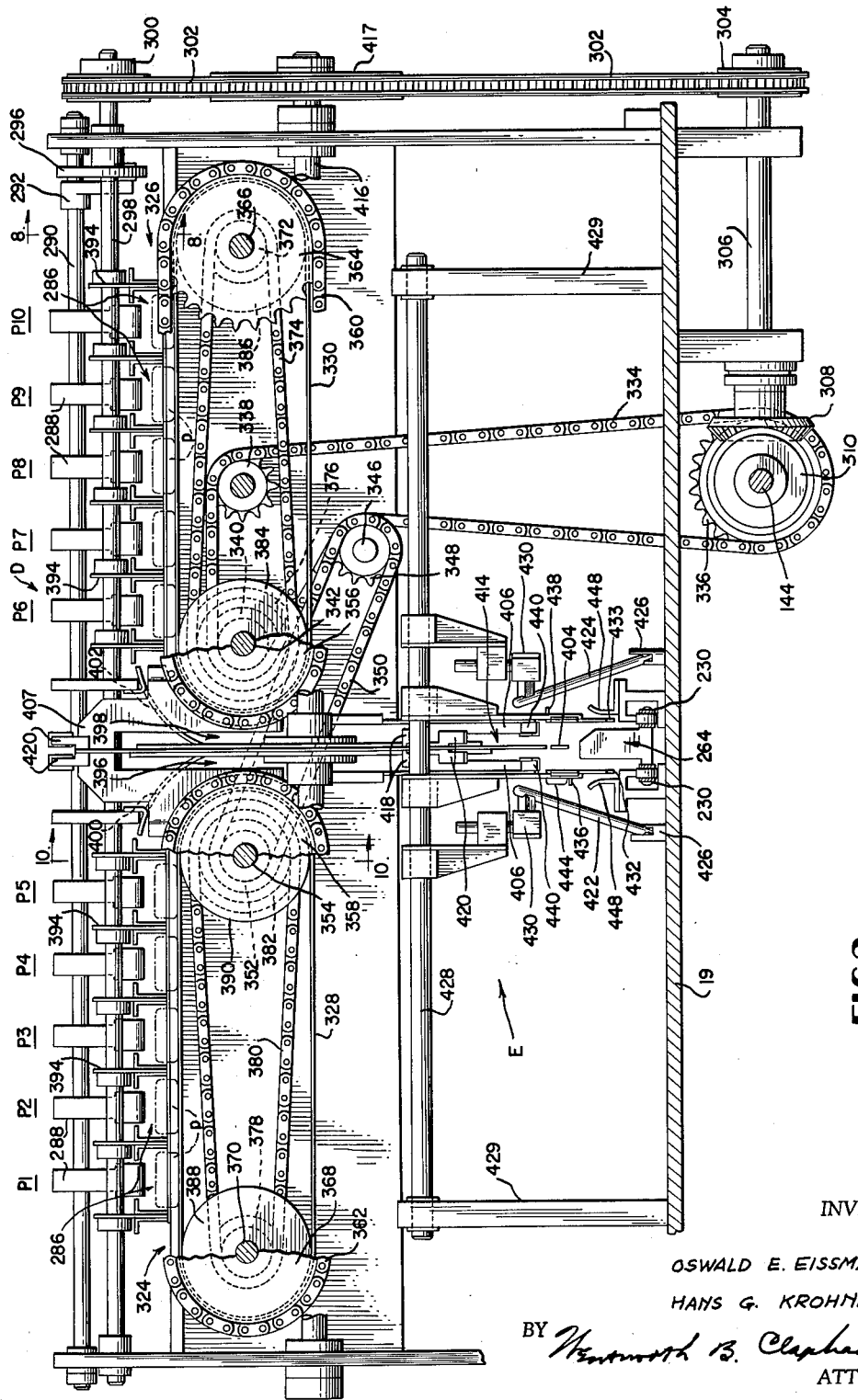

March 17, 1964  O. E. EISSMANN ETAL  3,124,914
CARTON FORMING AND FILLING APPARATUS AND METHOD
Filed Sept. 26, 1960  13 Sheets-Sheet 9
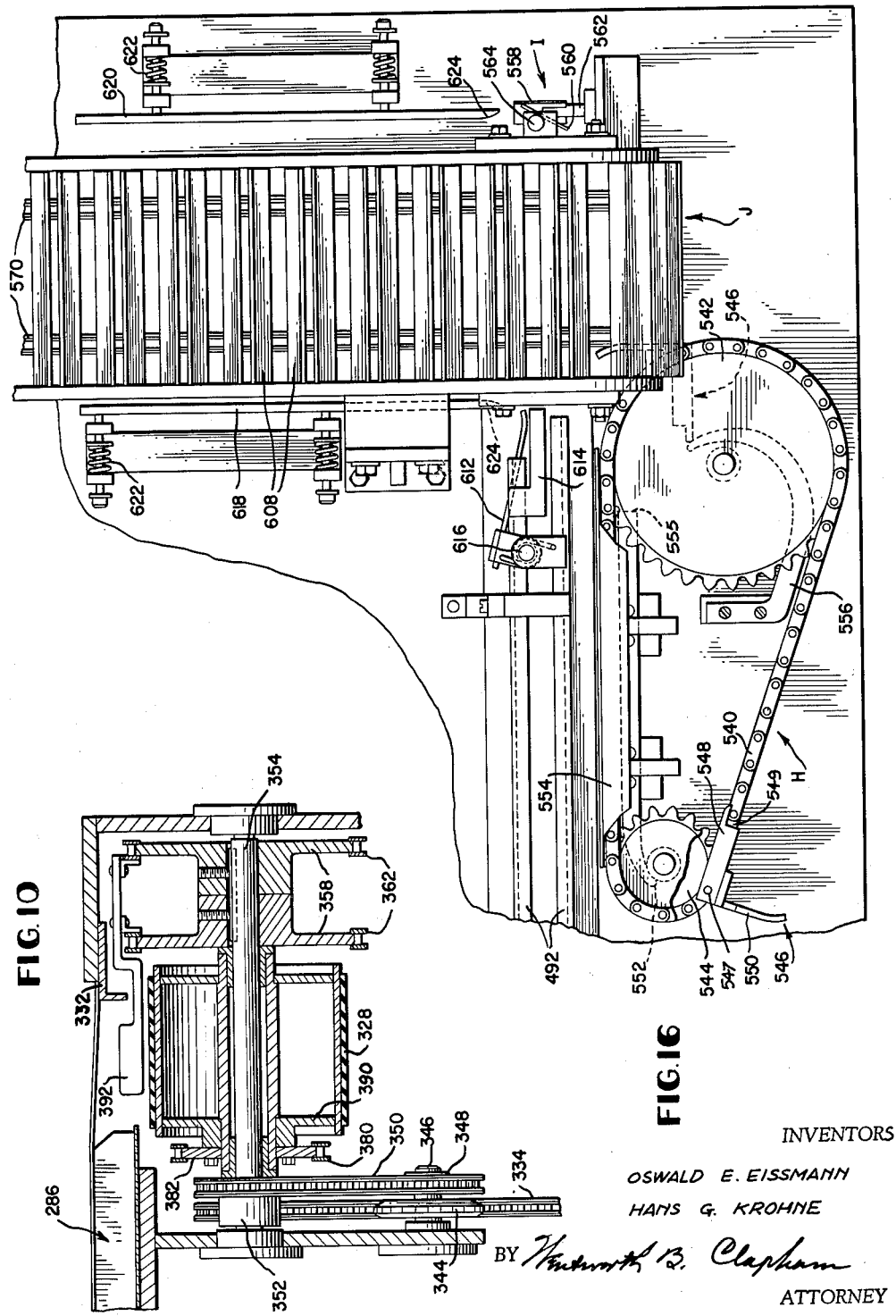
INVENTORS
OSWALD E. EISSMANN
HANS G. KROHNE
BY
ATTORNEY March 17, 1964 O. E. EISSMANN ETAL 3,124,914
CARTON FORMING AND FILLING APPARATUS AND METHOD
Filed Sept. 26, 1960 13 Sheets-Sheet 10

INVENTORS
OSWALD E. EISSMANN
HANS G. KROHNE
BY Wentworth B. Clapham
ATTORNEY

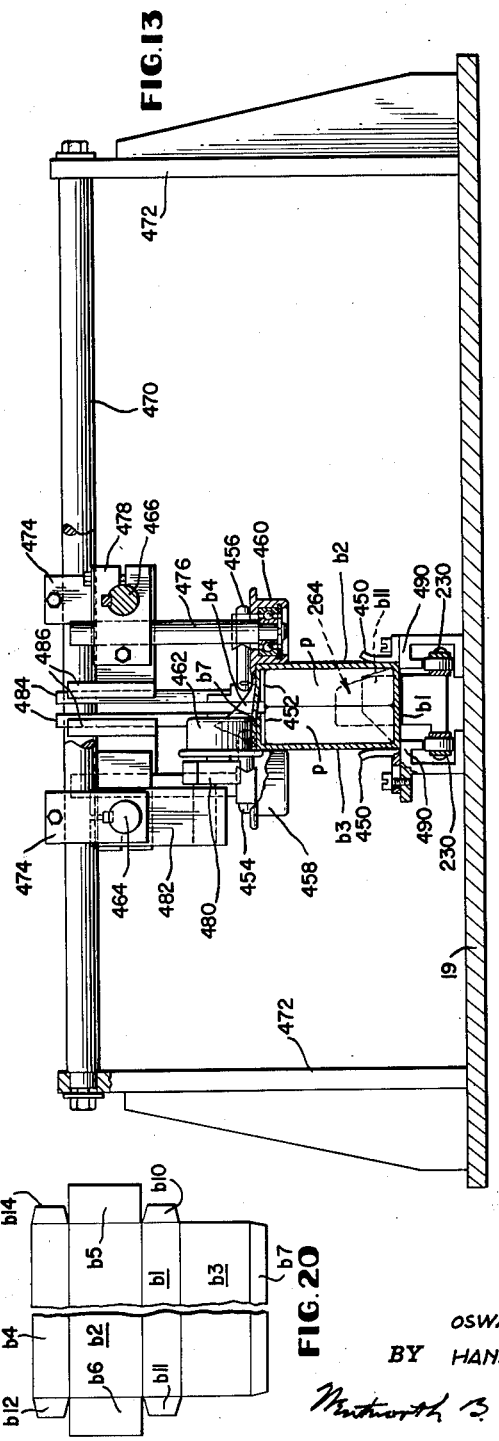

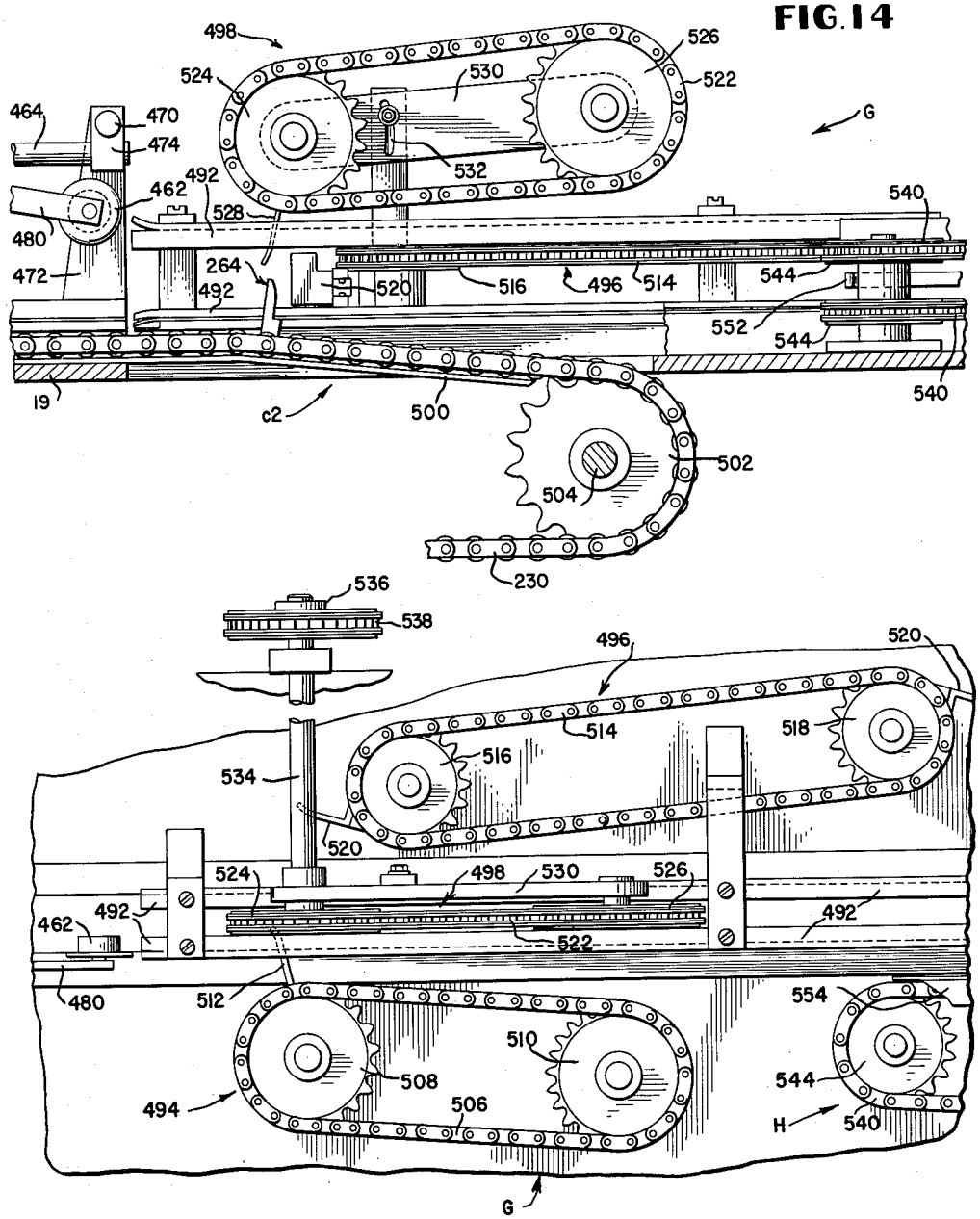

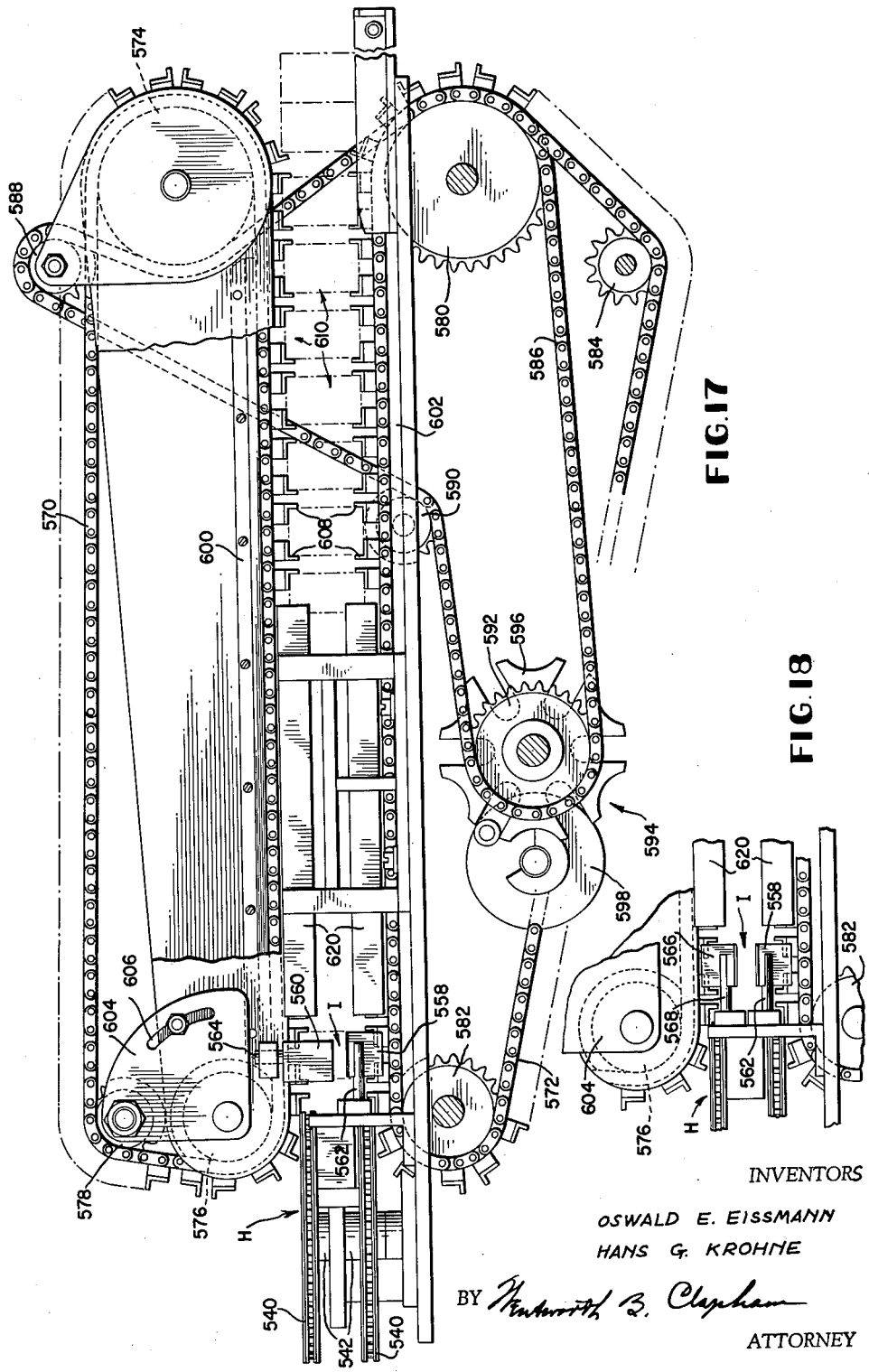

United States Patent Office 3,124,914
Patented Mar. 17, 1964

3,124,914
CARTON FORMING AND FILLING APPARATUS
AND METHOD
Oswald E. Eissmann and Hans G. Krohne, Richmond,
Va., assignors to American Machine & Foundry Company, a corporation of New Jersey
Filed Sept. 26, 1960, Ser. No. 58,390
10 Claims. (Cl. 53—26)

This invention relates to the forming and filling of cartons, and more particularly to the successive operations involved in the construction of cartons from carton blanks, the filling of the cartons with package units, and the closing and sealing of the filled cartons. The invention is especially well adapted to the production of cartons containing packs of cigarettes but is not limited to such employment.

In recent years advances have been made in the manufacture and packaging of cigarettes, but for the most part the placement of finished cigarette packs in cartons (conventionally ten packs to the carton) has remained an inefficient, manual operation. Considering the fact that the daily sales figures of any large cigarette manufacturer amount to many thousands of packs of cigarettes, it is unnecessary to enumerate the disadvantages of placing cigarette packs in their cartons by hand. Notwithstanding the pressing need for performing this operation automatically, the development of suitable automatic packaging apparatus has remained an elusive problem. The present invention provides a solution to this problem.

Broadly considered, it is a principal object of the present invention to provide efficient apparatus and method for forming and filling cartons, such as cigarette cartons, and the like.

Another principal object of the invention is to provide such apparatus which operates reliably, with unusual rapidity, and wihch will accommodate different types of cigarette packs, such as king size and regular, and different types of cartons.

A further principal object of the invention is to provide apparatus of the foregoing type which, when supplied with carton blanks and cigarette packs, is capable of forming the blanks into cartons, assembling groups of cigarette packs with the cartons, and closing and sealing the cartons with the packs inside.

A more specific object of the invention is to provide unique apparatus and method for supplying and feeding carton blanks and the like.

Another specific object of the invention is to provide improved apparatus and method for applying glue to carton blanks and the like.

A further object of the invention is to provide improved apparatus and method for folding the elements of carton blanks and the like.

Yet another object of the invention is to provide improved apparatus and method for advancing carton blanks through folding and filling stages.

An additional object of the invention is to provide improved apparatus and method for feeding package units to cartons which receive them.

Yet another object of the invention is to provide improved apparatus and method for segregating and advancing groups of packs and the like.

A still further object of the invention is to provide improved apparatus and method of the last-mentioned type which are substantially symmetrical.

Another object of the invention is to provide improved apparatus and method for feeding and spacing cigarette packs and the like.

Still another object of the invention is to provide improved apparatus and method for assembling groups of packs with cartons or carton blanks.

Yet another object of the invention is to provide apparatus and method of the foregoing type which are unique in correlating the movement of cartons with the movement of packs to be placed in the cartons.

Another object of the invention is to provide carton forming apparatus and method which ensure that the corners of the carton are sharply creased and squared.

An additional object of the invention is to provide unique conveyors.

A further object of the invention is to provide packaging apparatus of the type set forth above which incorporates a unique arrangement of interlocks so as to prevent the feeding of carton blanks in the absence of packs to be placed in the cartons, so as to prevent the feeding of packs in the absence of blanks, and so as to prevent the application of adhesive in the absence of carton blanks.

A more general object of the invention is to provide apparatus of the type set forth above in which the cartons (in their various stages of formation) are advanced substantially continuously.

Briefly stated, and without limitation, the more comprehensive aspects of the invention involve the feeding of carton blanks from a carton blank supply, the application of adhesive to the carton blanks, the feeding of cigarette packs or the like, the segregation of such packs into groups, the advancement of such groups, the assembly of the grouped packs with the carton blanks, the folding of the blanks to form cartons, and the closing, sealing, and conveying of the filled cartons.

The foregoing, and other objects, advantages, and features of the invention, and the manner in which the same are accomplished will become more readily apparent upon consideration of the following detailed description of the invention taken in conjunction with the accompanying drawings, which illustrate preferred and exemplary embodiments of the invention, and wherein:

FIGURE 3 is a transverse sectional view taken substantially along line 3—3 of FIGURE 2, but modified for clairity;

FIGURE 4 is a longitudinal vertical sectional view illustrating a gluer, a transfer section, and a folder-conveyor;

FIGURE 5 is a transverse sectional view taken substantially along the line 5—5 of FIGURE 4, but modified for clarity;

FIGURE 8 is a sectional view taken along line 8—8 of FIGURE 9;

FIGURE 9 is a transverse sectional view taken substantially along line 9—9 of FIGURE 7, but modified for clarity;

FIGURE 10 is a sectional view taken along line 10—10 of FIGURE 9;

FIGURE 13 is a sectional view taken along line 13—13 of FIGURE 11;

FIGURE 14 is a longitudinal vertical sectional view of another folding stage;

FIGURE 15 is a top plan view of the stage of FIGURE 14;

FIGURE 16 is a top plan view of conveying and folding stages;

FIGURE 17 is an end view, partly broken away, of the stages illustrated in FIGURE 16;

FIGURE 18 is an end view of a modified folding stage of the invention;

FIGURES 19a–19h are diagrams illustrating a carton blank and operations performed upon the blank to form the final carton;

FIGURE 20 is a fragmentary plan view of an alternative form of carton blank; and FIGURE 21 is a circuit diagram illustrating an arrangement of interlocks.

*General Description*

Figure 1:
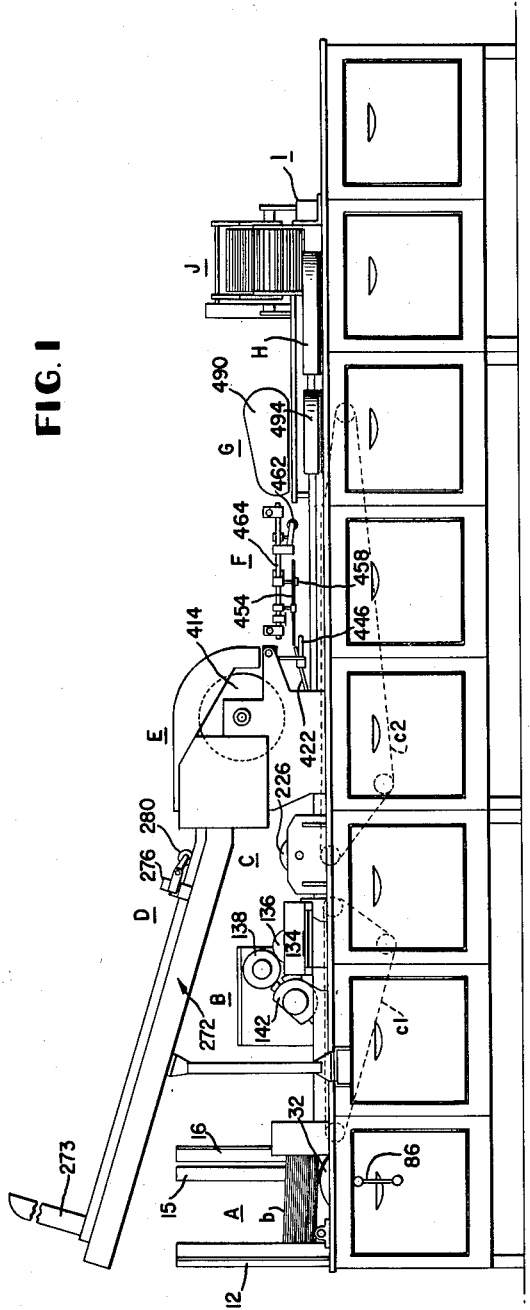
FIGURE 1 is a side elevation view illustrating the overall appearance of a machine constructed in accordance with the principles of the invention.

Before the details of the various parts of the invention are set forth, the major components of a complete carton forming and filling machine and the functions of such components will be described with reference to FIGURE 1 of the drawings. Commencing at the beginning of the machine, there is a carton blank supply and feed A, the function of which is to store a large number of blanks and to advance them successively, one-by-one, to a conveyor $c1$. Next comes a gluer B, the function of which is to apply adhesive to appropriate parts of each blank. Then there is a transfer section C at which the blank is transferred from conveyor $c1$ to another conveyor $c2$, and at which the folding of the blank is commenced. Next comes a pack supply and feed D, which stores and feeds cigarette packs in parallel columns. Then there is a pack-segregating and pack-blank assembly stage E. It is the function of this stage to segregate the packs into groups, which are then properly oriented and assembled with the blank. Also, the folding of the blank progresses at this stage. Then, there is a further blank-folding stage F, at which the blank becomes an open-ended tube carton. Next comes another folding stage G, then another conveyor H, which advances the filled carton to a folding stage I and to a final conveyor J. The final folding, closing, and sealing of the carton takes place while the carton is advanced by the conveyor J.

It will be noted that the apparatus of the invention forms a continuous assembly line from A to J. As will become apparent, the blanks advance continuously from the supply A to the conveyor J, which moves the cartons step-by-step transversely of the assembly line. The major components of the machine may be constructed in sections, which may be joined serially as in FIGURE 1.

*Blank Supply and Feed A*

The blanks utilized in the invention may assume different forms, a typical blank $b$ being illustrated in FIGURE 19a. The blank may be cut from a thin sheet of stiff paperboard or the like which is suitably contoured and scored to form the prospective walls and flaps of the carton. In the blank of FIGURE 19a there is a bottom wall $b1$, a rear wall (or side) $b2$ delineated from the bottom wall by a scoreline $s1$, a front wall (or side) $b3$ delineated from the bottom wall by a scoreline $s2$, a top wall $b4$ delineated from the rear wall by a scoreline $s3$, a leading end wall $b5$ delineated from the rear wall by a scoreline $s4$, a trailing end wall $b6$ delineated from the rear wall by a scoreline $s5$, and a series of tuck flaps. These flaps include a top flap $b7$ delineated from the front wall by a scoreline $s6$, a leading front flap $b8$ delineated from the front wall by a scoreline $s7$, a trailing front flap $b9$ delineated from the front wall by a scoreline $s8$, a leading bottom flap $b10$ delineated from the bottom wall by a scoreline $s9$, and a trailing bottom flap $b11$ delineated from the bottom wall by a scoreline $s10$. The foregoing parts of the carton blank will be referred to as the description progresses.

The terms "leading," "trailing," "front," "back," etc., are used for clarity of description with respect to the apparatus of the invention and not as limitations. As will be seen, the longitudinal reference axis of the machine of the invention preferably lies along the scoreline $s1$.

Figure 2:
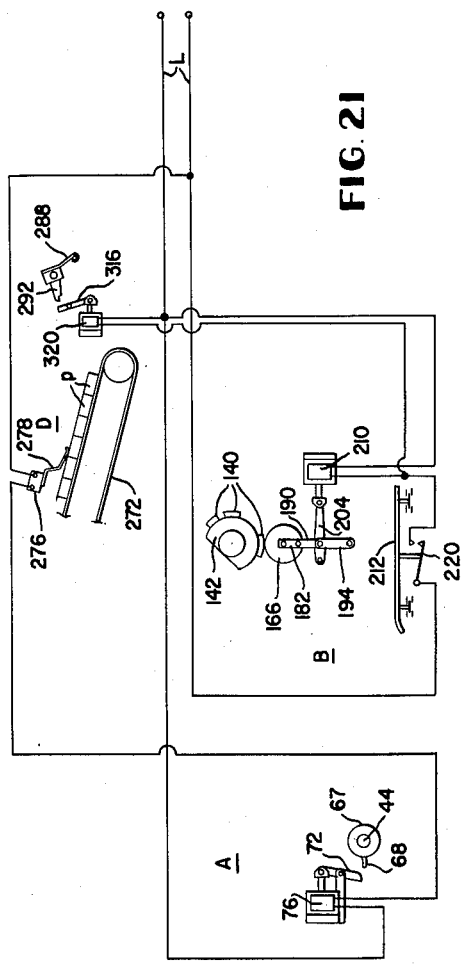
FIGURE 2 is a longitudinal vertical sectional view illustrating a carton blank supply and feed.

Referring to FIGURES 2 and 3, the blanks $b$ are arranged horizontally and are placed in a stack 10 between vertical guide membesr 12, 14 and 15 at the lateral edges of the stack and 16 at the leading edge of the stack. The guide members constitute a blank magazine. Member 16 is suspended above the bed 19 of the machine from a cross member 20 supported by vertical members 22 and 24 as shown in FIGURE 3. This mounting of member 16 provides a small space 26 between the lower end of the member and a bed plate 28, so as to constitute a miter gauge discharge opening through which only one blank may pass at a time, as shown in FIGURE 2. The vertical position of guide member 16 may be adjusted to permit variation of the size of the space 26. This is illustrated in FIGURE 2 by the slot and screw arrangement at 28. The surface of member 16 facing the stack of blanks is preferably contoured to conform with the configuration of the juxtaposed edge of the blanks. Thus, the surface may be V-shaped in cross section so as to fit within the notch between blank flaps $b8$ and $b10$ (FIGURE 19a). This ensures initial alignment of the blanks with the reference axis of the machine. The guide member 15 may be adjusted laterally, as indicated by the slot and screw arrangement 30 in FIGURE 3, to accommodate blanks of different configuration.

At its bottom the stack of blanks rests upon the bed plate 28, upon a series of parallel rollers 32, which are spaced across the machine as shown in FIGURE 3, and upon an eccentric roller 34, which extends across the bottom of the stack. Rollers 32 have arcuate portions 36, formed of embossed rubber, for example, which promote frictional contact with the bottom blank. These rollers are fixed to a transverse shaft 38 having a sprocket wheel 39 fixed thereto and driven by a chain 40. See FIGURES 2 and 3. This chain is in turn driven by a sprocket wheel 42 fixed to a shaft 44. The shaft 44 has a sprocket wheel 46 fixed thereto, which drives another chain, 48. This chain passes over an idler sprocket wheel 50 and over a sprocket wheel 52 affixed to a shaft 54, which supports a disc 56. Disc 56 and a corresponding disc 57 support an eccentric shaft 58 on which the eccentric roller 34 is mounted.

Shaft 44 has a sprocket wheel 60 driven by a chain 62 from a sprocket wheel 64 fixed to a shaft 66. Sprocket wheel 60 is coupled to shaft 44 by a conventional single revolution clutch 67, which is normally engaged and which is disengaged by the action of a dog 68. The dog may be tripped each revolution by an abutment 70 (FIGURE 2) on the end of a lever 72 pivotally connected to the armature 74 of a solenoid 76. When the dog is tripped, the clutch must complete on revolution before it can be re-engaged. The abutment is normally held out of the way of the dog 68 by spring 78. The purpose of this arrangement will appear hereinafter.

Shaft 38 is supported on a chassis 80 pivotally mounted on the sides of the main frame for movement about the axis of shaft 44. The bottom of the chassis 80 is engaged by cam 82 on a shaft 84, which may be turned by a manual control lever 86 (FIGURE 3), so as to move the rollers 32 upward into engagement with the bottom of the blank stack or downward out of engagement with the stack.

Shaft 66 is driven by a sprocket wheel 88 fixed thereto, and the sprocket wheel is driven by a chain 90 of the conveyor $c1$ to be described more fully hereinafter. Shaft 66 also carries a gear 92 (FIGURE 3), which drives a gear 94 fixed to a shaft 96. This shaft is rotatably supported by bell cranks 98 which are pivoted at 99 on brackets 100 suspended from the cross member 20. The bell cranks are resiliently biased by springs 102 (FIGURE 2) to cause rollers 104 fixed to shaft 96 to be urged downwardly toward rollers 106 driven by shaft 66.

Rollers 32 turn clockwise in FIGURE 2 and advance the bottom blank through the miter gauge 26 when the frictional sections 36 come around to engage this blank. The eccentric roller 34 is moved counterclockwise by its drive chain 48 and is phased with respect to the rollers 32 so as to lift the remaining blanks and urge those near the bottom of the stack backward after the trailing edge of the bottom blank has moved off of the eccentric roller. The lifting of the remaining blanks reduces the pressure of the stack on the advancing bottom blank, and the backward force applied to the blanks near the bottom of the stack discourages the advancement of more than one blank at a time. The blanks near the bottom of the stack engage bevelled backstop members 120 and 122, the vertical and horizontal positions of which may be adjusted by the arrangement of slots and screws shown. The backstop members prevent the blanks from being forced out of the back of the magazine and tend to split the stack, as shown in FIGURE 2, to further reduce the downward pressure applied by the stack to the advancing bottom blank. The blanks are advanced one-by-one in spaced relationship, because the active portions 36 of rollers 32 occupy only a minor portion of the roller circumference.

The bottom blank is advanced by rollers 32 to rollers 104 and 106, which further advance the blank. Chain 90 of conveyor c1 carries pushers 108, which extend outwardly from certain links of the chain. After a blank passes between the rollers 104 and 106 it pauses for a moment until a pusher 108 catches up to the blank and engages the trailing edge. Chain 90 has rollers 110 which support the chain for horizontal movement over a supporting surface 112. As shown in FIGURE 3, the advancing blank is supported and guided by guides 114 and 116 and is held down by an elongated, grooved hold-down member 118, the pushers 108 having fingers which move in the grooves of the hold-down member. Guide 114 is shown laterally adjustable to accommodate different types of blanks.

As shown in FIGURE 4, the conveyor chain 90 passes over an idler sprocket 123 and is driven from a sprocket wheel 124 fixed to shaft 126, which supports a sprocket wheel 127 driven by a chain 128 from a sprocket wheel 129 on shaft 130. Sprocket wheel 124 has adjustment slots 132 which permit variation in the timing of the pushers 108 with respect to the associated apparatus of the machine.

The Gluer B

Each blank b is advanced by its pusher 108 to a gluer B (FIGURES 4 and 5). The gluer comprises a glue pot 134 (FIGURE 4) in which a suitable adhesive, such as liquid glue, is placed. A roller 136 rotates in the glue pot and transfers glue to a second roller 138, which in turn transfers glue to gluing sectors 140 on discs 142 (see FIGURE 5). The bearings of roller 136 are located in the glue pot, and the liquid glue serves to lubricate the bearings during rotation of the roller. The drive for the gluer is obtained from a drive shaft 144 (FIGURE 4), through bevel gears 146 and 148, a spur gear 150 rotatable with gear 148, a spur gear 152, and a spur gear 154 fixed to a shaft 156 (see FIGURE 5). The discs 142 are mounted on a sleeve 157 driven by shaft 156. Gear 154 drives another spur gear 158 (FIGURE 4), which drives the roller 138. Roller 136 is driven by friction contact with roller 138. As shown in FIGURE 5, another spur gear, 160, is fixed to spur gear 154 and drives a spur gear 162 fixed to a shaft 164, which drives a backing roller 166.

Knives 168 and 170 (FIGURE 4) remove excess glue from the rollers 136 and 138. A cylindrical baffle 172 spaced from the roller 136 has a slot 174 below the knife 168, and when the roller 136 rotates, glue is circulated between this roller and the baffle and through the slot 174. This arrangement prevents the glue from being forced over the wall of the glue pot when the gluer is operated at high speed.

The gluing sectors 140 are located to apply spots of adhesive at appropriate locations on certain walls and flaps of the blank. As shown in FIGURE 5, the sectors may be removable to accommodate different gluing patterns. FIGURE 19b illustrates appropriately placed spots of adhesive a for the type of blank shown. Knobs 176 and 178 may be removed to permit withdrawal of the discs 142 (with sleeve 157) and the roller 138, for cleaning. The glue pot 134 is mounted on rails 180 and may be slid transversely of the machine and removed for cleaning.

The backing roller 166 of the gluer is rotatably mounted on a pair of vertical supports 182 and 184 (FIGURE 5), which are arranged to slide within vertical guides 186 and 188. The lower ends of the supports 182 and 184 are pivotally connected to links 190 and 192, respectively, which in turn are pivotally connected to links 194 and 196, the lower ends of which are joined by a shaft 198 which is rotatably supported on depending portions 200 and 202 of the machine frame. At the junction of links 190 and 194 there is pivotally connected a horizontal link 204 (see FIGURE 4), one end of which is connected to a spring 206 fixed to the frame, and the other end of which is connected to the armature 208 of a solenoid 210. The roller 166 is thus supported on a pair of toggles. When the solenoid is energized, link 204 is drawn to the right in FIGURE 4, drawing down the vertical supports 182 and 184 for the backing roller 166. This withdraws the backing roller from its normal gluing position and prevents the application of glue to the backing roller in the absence of a blank at the gluer. Spring 206 returns the backing roller to its gluing position when the solenoid 210 is de-energized. Although gear 162 also moves up and down, the movement is not sufficient to disengage this gear from gear 160.

As shown in FIGURE 5, the blank is advanced through the gluer by its pusher 108, the blank being held down by the hold-down member 118 and by lateral guiding, hold-down, and supporting members 222 and 224. As the blank b enters the gluer, it engages the sloping end of and depresses a rod 212 (see FIGURE 4), which is pivotally mounted on brackets 214. The rod may be provided with an adjustable counterweight 216, as shown in FIGURE 5, to control the normal upward bias of the rod toward the blank. In the absence of a blank at the gluer, the rod will turn about its pivots, and a lug 218 (FIGURE 4) on the rod will move upwardly so as to permit a switch 220 to close. The purpose of this switch will become apparent hereinafter.

Transfer Section C

Figure 6:
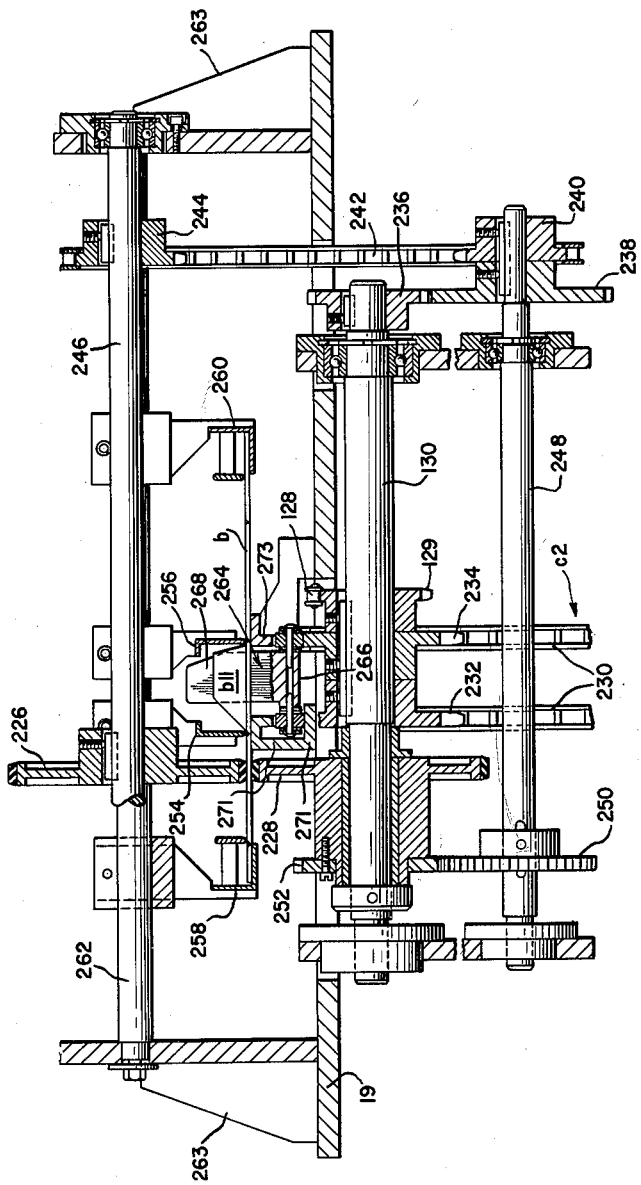
FIGURE 6 is a transverse sectional view taken substantially along line 6—6 of FIGURE 4, but modified for clarity.

The pusher 108 advances the blank b past the gluer B to the transfer section C (FIGURES 4 and 6), which comprises a pair of driven transfer rollers 226 and 228, between which the blank passes. Conveyor chains 230, which form part of a second chain conveyor c2 to be described more fully hereinafter, drive sprocket wheels 232 and 234 (see FIGURE 6) fixed to the shaft 130. The upper transfer roller, 226, is driven from the shaft 130 by gears 236 and 238, sprocket wheel 240, chain 242, sprocket wheel 244, and shaft 246 to which the roller 226 is fixed. The lower roller, 228, is driven from the gear 238, shaft 248, and gears 250 and 252, the latter being fixed to the roller 228. As shown in FIGURE 6, the roller 228 is rotatable with respect to shaft 130. The drive train is constructed so that roller 228 rotates at the same speed as roller 226. The transfer section also includes hold-down members 254 and 256 for the blank b, as well as lateral guides 258 and 260, all of which may be suspended from a horizontal rod 262 mounted on vertical supports 263.

Figure 7:
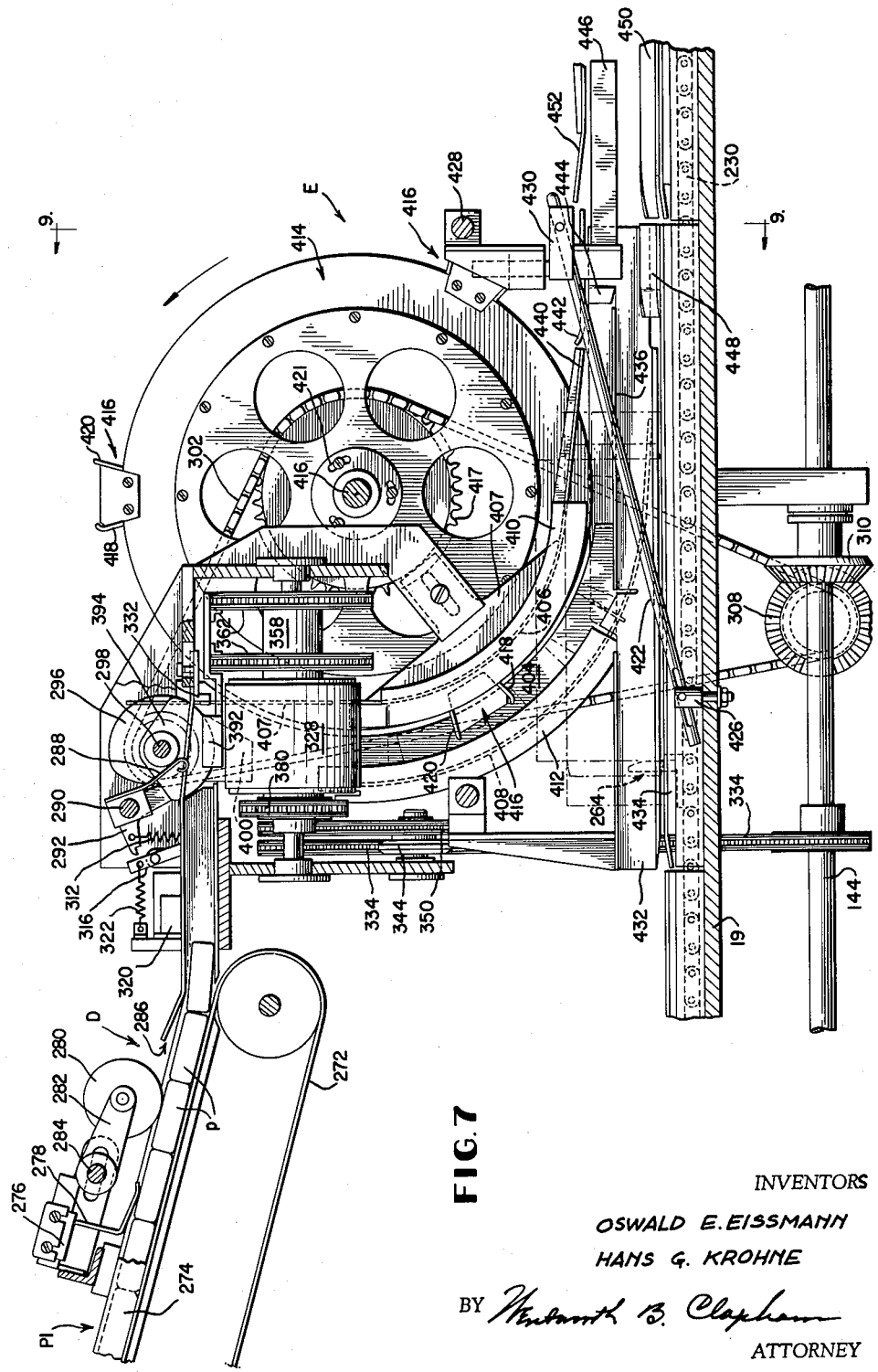
FIGURE 7 is a longitudinal vertical sectional view of a pack supply and feed, a pack-blank assembly stage, and a blank-folding stage, certain parts being omitted for clarity.

The purpose of the transfer section C is to transfer the blank b from the first chain conveyor c1 to the second chain conveyor c2. The second chain conveyor comprises the parallel chains 230, between which pushers 264 are mounted (FIGURES 4 and 6). Each pusher has a base 266, which may be pivotally connected at its ends to each of the parallel chains, the base being slotted at its trailing end to accommodate some reciprocative movement between the corresponding pivot pin and the base when the chains pass over their sprocket wheels. The pushers also have a salient portion 268 which extends outwardly from the chains and which engages the trailing end of the carton blank as shown in FIGURE 4. The timing of the pushers 264 with respect to the blanks is adjusted so that a pusher engages the trailing end of a blank at the transfer section C. The pusher engages the trailing bottom flap *b*11 and bends it upwardly, as indicated in FIGURES 4 and 19*c*. During the bending of the flap, the carton blank is held down by the hold-down members 254 and 256 previously described, which are aligned with scorelines *s*2 and *s*1, respectively. When the flap is bent up perpendicular to the major portion of the blank, the resultant corner at the trailing end of the blank fits within a corresponding corner 270 formed on the salient portion 268 of the pusher. The corner 270 serves to support the bottom of the blank during subsequent folding of the blank sides and prevents buckling of the blank. The linear speed of the pusher is the same as the linear speed of the rollers 226 and 228, and the pusher passes between the hold-down members 254 and 256 as shown in FIGURE 6. The chains 230 have rollers 110 like those of chain 90, the rollers supporting the chains for horizontal movement along surfaces of chain guides 271 and 273, which also support the blank. From the transfer section C the blanks are advanced to the pack-segregating and pack-blank assembly stage E, which receives cigarette packs *p* from the pack supply and feed D as shown in FIGURES 7 and 9.

*Pack Supply and Feed D*

The pack supply and feed comprises apparatus for advancing columns of cigarette packs to the segregating and assembly stage. In the illustrative form of the invention the cigarette packs are advanced by means of belt conveyors 272, which preferably slope downwardly toward the assembly stage as shown in FIGURE 7. When cartons are to be filled with ten packs of cigarettes, with the packs arranged in adjacent rows of five packs each, the cigarette pack supply and feed comprises ten columns of cigarette packs, the columns being arranged five on one side of the median plane of the assembly stage and five on the other side. In FIGURE 9 the columns are designated P1, P2, P3, P4, P5 (on one side), and P6, P7, P8, P9, and P10 (on the other side). Each column may have a separate conveyor belt 272 or there may be one conveyor belt for all ten columns. The pack conveyor may be loaded from a magazine 273 (FIGURE 1) or from any other suitable pack source. The cigarette packs are guided by column-defining side walls such as 274 (FIGURE 7), and the columns are spaced laterally somewhat, as indicated by the spacing of the packs *p* in FIGURE 9. The packs are arranged with their major axis in the direction of travel on the conveyor belt and lie flat as shown in FIGURE 7.

At least one of the columns has a switch 276 with a pack-sensing element 278. The purpose of this switch will become apparent hereinafter. Each column has a weighted roller 280 supported on an arm 282 pivoted on a mounting member at 284. The rollers press down on the packs as they pass under the rollers and force them into driving contact with the conveyor belt 272, from which they are fed to horizontal channels 286 as shown in FIGURE 7.

*Pack Segregating and Assembly Stage E*

At the exit of each horizontal channel 286 there is a hold-back finger 288, the fingers being fixed to an oscillating shaft 290 supported on the frame of the machine as shown in FIGURE 9. At one end of the shaft 290 there is fixed a bell crank 292 (see FIGURE 8), one arm of which carries a cam follower 294 engaging a cam 296. The cam is mounted on a shaft 298 rotatably supported on the frame of the machine and carrying a sprocket 300 driven by a chain 302 (see FIGURE 9). Chain 302 is driven by a sprocket 304 on a shaft 306 having a bevel gear 308 driven by a bevel gear 310 on the drive shaft 144. As can be seen from FIGURE 8, the cam follower 294 is urged against the cam 296 by a spring 312, and in accordance with the contour of the cam, the shaft 290 is turned so as to place the hold-back fingers 288 (FIGURE 7) in the path of or out of the path of the advancing cigarette packs. When the fingers are "up," the cigarette packs may be advanced from the channels 286, and when the fingers are "down," the channel exits are closed.

The hold-back fingers 288 may be locked in their down position by the engagement of a notch 314 on the bell crank 292 with the end of a lever 316 pivotally connected to the armature 318 of a solenoid 320. Spring 322 turns the lever 316 so as to release the bell crank when the solenoid is de-energized. The purpose for this arrangement will become apparent hereinafter.

The pack-segregating mechanism comprises means for forming two groups of five packs each. In accordance with a preferred form of the invention, the horizontal channels 286 deliver packs of cigarettes to two transverse conveyors 324 and 326 (see FIGURE 9), each of which receives five packs in a row and moves the packs toward the median plane of the assembly stage. In the form shown the transverse conveyors comprise conveyor belts 328 and 330 to which the packs are delivered from the horizontal channels 286. The packs are moved onto the conveyor belts by the pressure of succeeding packs on the column conveyor 272 and by the momentum of the packs themselves. In moving from the horizontal channels 286 the packs drop slightly as indicated in FIGURE 7 and engage a stop member 332, which may be adjustable as indicated, to accommodate different size packs. The space between each channel exit and the stop member is sufficient to receive only one pack.

The conveyor belts 328 and 330 are driven continuously by a drive chain 334 (FIGURE 9) driven by a sprocket wheel 336 on the shaft 144. Chain 334 passes over an idler sprocket wheel 338 and drives a sprocket wheel 340 fixed to a shaft 342. Chain 334 also passes over a sprocket wheel 344 fixed to shaft 346 (see FIGURE 10), which also carries a sprocket wheel 348 driving a chain 350. Chain 350 drives a sprocket wheel 352 fixed to a shaft 354. It will be apparent that shafts 342 and 354 rotate in opposite directions.

Shaft 342 has a double sprocket wheel 356 fixed thereto like the double sprocket wheel 358 fixed to the shaft 354 and shown in FIGURE 10. The double sprocket wheel 356 drives a pair of chains 360 like the chains 362 driven by the double sprocket wheel 358 as shown in FIGURE 10. Chains 360 drive another double sprocket wheel, 364, fixed to a shaft 366. Chains 362 drive a double sprocket wheel 368 fixed to a shaft 370. Shaft 366 has a smaller sprocket wheel 372 affixed thereto, which drives a chain 374, which in turn drives a sprocket wheel 376. Similarly, shaft 370 has fixed thereto a smaller sprocket wheel 378, which drives a chain 380, which in turn drives a sprocket wheel 382 (see FIGURE 10). Sprockets 376 and 382 are rotatably mounted with respect to their shafts 342 and 354, respectively.

Conveyor belt 330 is supported by a pair of drums 384 and 386. Similarly, conveyor belt 328 is supported by a pair of drums 388 and 390. Drum 384 is rotatable with respect to its shaft 342 and is driven by the sprocket wheel 376 from the chain 374. Similarly, drum 390 is rotatable with respect to its shaft 354 and is driven by the sprocket wheel 382 from the chain 380 (see FIGURE 10). Drum 386 is driven by the conveyor belt 330, and drum 388 is driven by the conveyor belt 328, the drums rotating relative to their shafts 366 and 370, respectively. Since the sprocket wheel 372 is smaller than the sprocket wheel 376 over which chain 374 passes, drums 384 and 386 turn at a slower rate than the shafts 342 and 346. Similarly, drums 388 and 390 turn at a slower rate than their shafts 370 and 354.

The double chains 360 and 362 carry sweepers, such as the sweeper 392 shown in FIGURES 7 and 10. These sweepers are arranged to move along the surface of the associated conveyor belts in the same direction as the belt movement. Because of the speed reduction effected by the chains 374 and 380 as described above, the sweepers move at a faster linear rate than the belts.

In the form of the invention illustrated, the transverse shaft 298, which extends along the conveyor belts 328 and 330, carries a series of asymmetrical discs or plates 394. The discs are generally sectoral in shape as shown in FIGURE 7, extending transversely of the conveyor belts and in alignment with the walls separating the pack columns. The discs may be placed into or out of the path of the cigarette packs on the conveyor belts, depending upon the rotational position of the shaft 298. In the position illustrated in FIGURES 7 and 9 the discs block the movement of cigarette packs on the belts. Hence, the packs which are delivered to the belts from the horizontal channels 286 move with the belts until they engage the discs 394. Then their movement is terminated, although the conveyor belts continue to move, slipping beneath the cigarette packs. When the shaft 298 rotates to turn the discs 394 out of the path of the cigarette packs on the conveyor belts, the cam 296 on the shaft 290 causes the hold-back fingers 288 to block the horizontal channels 286. Thus, when the cigarette packs on the conveyor belts are free to move with the belts, the delivery of additional packs to the conveyor belts is stopped.

The timing of the sweepers 392 with respect to the movement of the discs 394 is such that after the discs are lifted to permit movement of the cigarette packs, the sweepers 392 overtake the trailing packs on the conveyor belts. Since the sweepers are moving in the same direction as the packs, there is little shock when they engage the packs and advance them successively with respect to the associated conveyor belts, taking up the space between packs. The packs are fed to a pair of chutes 396 and 398, the timing being such that the first two packs on each conveyor belt enter the chutes before the sweepers overtake the trailing packs. After the conveyor belts are swept clean, the discs 394 are lowered again, and the fingers 288 are raised to permit two more groups of five packs each to be advanced to the conveyor belts.

The chutes 396 and 398 lie on opposite sides of the median plane of the assembly stage and may be viewed as being two halves of one chute. The entrance portions of the chutes are defined by the conveyor belts 328 and 330 as they pass around their drums 384 and 390, respectively, and by curved plates 400 and 402 parallel to the corresponding belts. Separating the chutes and defining a partial side wall is an arcuate plate 404 (FIGURE 7) in the median plane of the assembly stage. Curved plates 406 on opposite sides of the plate 404 and spaced therefrom define partial top walls of the chutes. Plates 406 are mounted on adjustable support 407 to accommodate different pack sizes. Plates 406 merge with the bifurcations of a plate 407 at the entrance to the chutes. Curved plates 408 on opposite sides of the plate 404 and spaced therefrom define partial bottom walls of the chutes. Arcuate plates 410 and 412 form flanges for the plates 406 and 408, respectively, to define partial side walls spaced from wall 404. The curved chutes thus defined lead the cigarette packs downward along a curved path which becomes tangent to the path of the blanks b. Referring, for example, to the chute 396 illustrated in FIGURE 7, it will be seen that the packs slide downward along the bottom plate 408 of the chute, being moved by gravity and being guided by the top plate 406 and by the side plates 404, 410, and 412. When the packs lie on the conveyor belts 328 and 330, their long dimension is parallel to the longitudinal reference axis of the machine. The chutes re-orient the packs so that their long dimension is vertical and so that the packs stand on end with their larger sides parallel to the median plane of the assembly stage.

Aligned with the median plane of the assembly stage is a vertical assembly wheel 414. This wheel is a disc fixed to a shaft 416 which extends transversely of the machine and is rotatably supported on the frame as shown in FIGURE 9. The shaft has a sprocket wheel 417 fixed thereto, and the sprocket wheel is driven by chain 302 previously described. In FIGURE 7 the wheel turns counterclockwise. The peripheral portion of the wheel complements the median wall 404 and assists in guiding the cigarette packs. The assembly wheel has a plurality of pusher units 416 extending outwardly from its periphery, there being three pusher units spaced 120° in the form shown. Each pusher unit has a bifurcated pusher plate 418 and a bifurcated hold-back plate 420, the hold-back plate being spaced behind the pusher plate with respect to the direction of wheel movement. There are thus three pusher plates 418 and three hold-back plates 420 associated with each of the chutes 396 and 398. The pusher units 416 are arranged to extend into the chutes through their top wall and to be moved along the chutes in succession.

The assembly wheel 414 is rotated in timed relationship with the sweepers 392, which advance the cigarette packs on the conveyor belts 328 and 330 into the chutes 396 and 398, the timing being adjustable by virtue of the slots 421. As the cigarette packs enter the chutes 396 and 398, the leading pack on each side of the wheel 414 comes into contact with an assembly wheel hold-back plate 420, which is already in the chutes. As the wheel turns, additional packs are swept into the chutes by the sweepers 392, so as to form a row of packs in each chute. Advacement of the rows is controlled by the hold-back plate 420 until it reaches the bottom of its circular path and starts to move upward. The pusher plate 420 of the next pusher unit 416 then overtakes the trailing pack of each row and advances the rows of packs out the bottom of the chutes for assembly with a blank as will be described. The hold-back plate 420 of the last-mentioned pusher unit 416 controls the advancement of the next two rows of packs, which by this time have been swept into the chutes 396 and 398 by the sweepers 392. Thus, as each pusher unit travels through the chutes, it separates the cigarette packs to be assembled with two successive blanks.

In accordance with the form of the invention illustrated, the front and rear walls b3 and b2 of the carton blank are folded up substantially at the pack-blank assembly stage. This is preferably accomplished by a pair of rods 422 and 424, which extend upwardly and converge toward the median plane of the assembly stage as shown in FIGURES 7 and 9. The lower ends of the rods may be supported on the machine frame by brackets 426, the mounting being constructed to permit a degree of pivotal adjustment vertically and horizontally and to permit a degree of longitudinal adjustment. The upper ends of the rods are suspended from a transverse frame member 428 (mounted on vertical supports 429) by means of brackets 430, which preferably permit a degree of pivotal adjustment. When the blank engages the rods, it is held down by hold-down members 432 and 433, which are suspended above blank-supporting members 434. The lateral edges of the carton blank engage the lower portions of the rods, causing the front and rear walls of the carton blank to be folded upwardly as indicated in FIGURE 19d, the folding progressing as the blank advances. due to the convergence of the rods. In order to form sharp corners at the bottom of the carton, members 432 and 433 have lower edges located long the scorelines s1 and s2 to provide forms about which the corners may be constructed. Members 432 and 433 also have laterally extending flanges 436 and 438, which keep the front and rear walls of the carton bowed outwardly somewhat as the walls are folded upwardly. This permits the carton walls to clear certain structural elements of the machine to be described and prevents smearing of the adhesive on the inner surface of the top wall of the carton, which at this stage extends upwardly from the rear wall.

At the exits of the chutes 396 and 398 the bottom walls 408 taper down to very small horizontal ledges associated with the side walls 412 of the chutes. This permits the protruding pusher 264 of the conveyor c2 to enter the chutes from the bottom, the median wall 404 being cut back to prevent obstruction of the pusher. The timing of the pusher 264 with respect to the assembly wheel 414 is such that the conveyor pusher becomes aligned with a wheel pusher unit as the latter approaches the bottom of its circular path. At this time the wheel pusher unit 416 is advancing two rows of five packs each onto the blank being advanced by the conveyor pusher 264 and being folded by the rods 422 and 424. The cigarette packs are advanced out of the bottom of the chutes 396 and 398 and into a channel defined by top guide 442 and side guides 444. The chutes have top wall extension plates 440 which lead to guide 442. After the pusher of the assembly wheel loses contact with the trailing packs, the packs are advanced by virtue of their support on the blank, which is still being advanced by pusher 264. At this time the trailing packs are slightly ahead of the bent up bottom flap b11 engaged by the pusher 264. Resilient retarding strips 446 engage the sides of the packs so as to retard pack movement enough to permit the bottom flap b11 of the carton to catch up to the trailing packs, the packs sliding relative to the blank. Now the packs assume their proper location on the carton bottom wall.

The bent up front and rear walls of the carton are guided by side guides 448, clearing the supports for the retarding strips 446 by virtue of the bowed wall configuration. As the packs are held back by the retarding strips 446, the front and rear walls of the carton are guided by side guides 450, the retarding strips 446 being interposed between these walls and the cigarette packs. The cigarette packs are held down by thin, springy hold-down strips 452.

From the foregoing description it is apparent that the assembly wheel 414 takes the two rows of five packs each supplied from the transverse conveyor belts 328 and 330 and places these rows upon the advancing blank as the front and rear walls of the blank are folded up. Since the cigarette packs are properly located on the blank as the blank leaves the assembly stage, the remaining carton folding operations may now proceed.

*Top Folder F*

Figure 11:
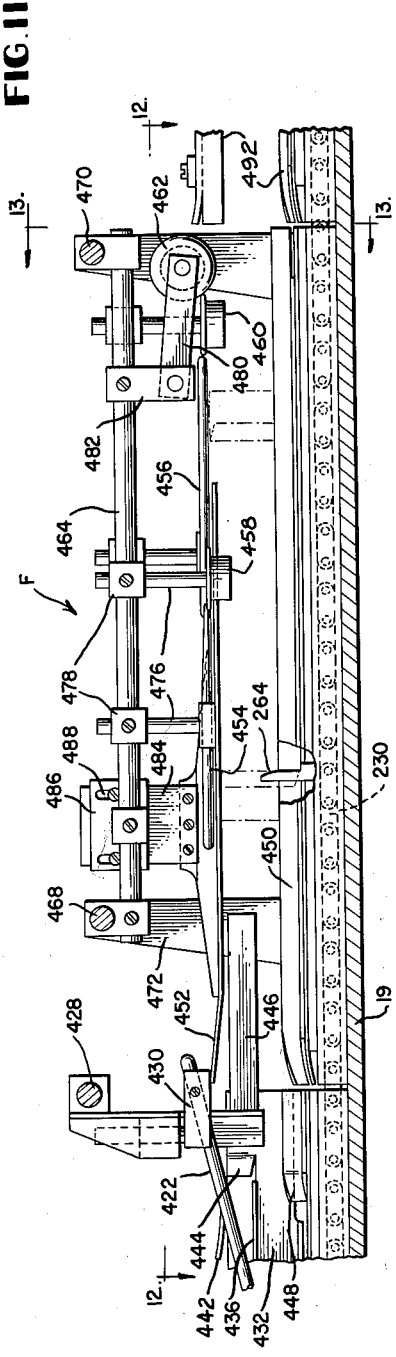
FIGURE 11 is a longitudinal vertical sectional view of a blank-folding stage.
Figure 12:
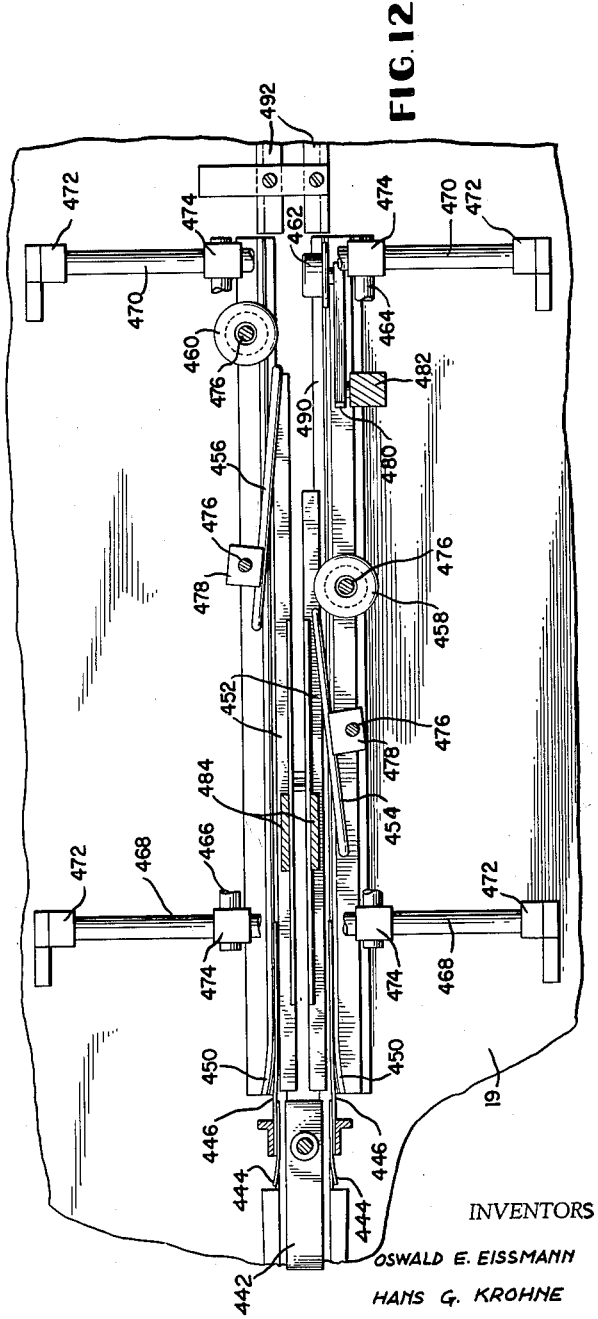
FIGURE 12 is a sectional view taken along line 12—12 of FIGURE 11.

FIGURES 11, 12, and 13 illustrate the preferred apparatus of the invention for folding the top flap (which now extends upwardly from the front wall) and the top wall (which now extends upwardly from the rear wall), and for sealing them. The folding and sealing mechanism comprises a pair of horizontal rods 454 and 456, a pair of rollers 458 and 460 rotatable about vertical axes, a weighted roller 462 rotatable about a horizontal axis, longitudinal support members 464 and 466, and transverse support members 468 and 470. The transverse members 468 and 470 are supported on vertical posts 472 from the machine frame. The longitudinal members 464 and 466 are supported on brackets 474 from the transverse members. The longitudinal members may be adjusted laterally on the transverse members, so as to accommodate different cartons. The folding rods 454 and 456 and the rollers 458 and 460 are supported from vertical rods 476, which are in turn suspended from the longitudinal support rods 464 and 466 by brackets 478. The brackets 478 are adjustable along the support rods 464 and 466 to accommodate different types of cartons. Roller 462 is supported on an arm 480 pivotally mounted on a depending bracket 482 from the longitudinal support rod 464 and may be adjusted along this rod. The pack hold-down plates 452 are suspended from vertical supports 484, which are mounted on brackets 486 suspended from the longitudinal support rods 464 and 466. The hold-down plates may be vertically adjusted, as indicated in FIGURE 11 by the slots 488, so as to accommodate different types of cigarette packs.

As the partially folded carton enters the folding stage F, the bottom of the carton is supported on ledges 490 (best seen in FIGURE 13) which are part of guides for the chains of the conveyor c2 having the pusher 264. The front and rear walls of the carton are guided by the guide members 450, one of which may be made laterally adjustable as shown in FIGURE 13 to accommodate different sizes of cartons. As the carton is advanced, the upstanding top flap b7 engages the trailing portion of the folding rod 454. The rod is inclined toward the carton, and continued advancement of the carton causes the top flap b7 to be folded down over the edge of the adjacent hold-down strip 452, this edge being located along the scoreline s6 of the blank as shown in FIGURE 13. As flap b7 is folded down, the carton advances to the roller 458, which has a cylindrical surface engaging the upper extremity of the front wall of the carton and a disc flange which overlies the flap. The purpose of the roller 458 is to form a sharp crease along the scoreline s6 and to form a square corner. While this corner is formed, the upstanding top wall b4 of the carton engages the trailing portion of the folding rod 456, which also is inclined toward the carton. Continued advancement of the carton causes the top wall to be folded down over the edge of the adjacent hold-down strip 452 and then onto the folded down top flap b7. The edge of the adjacent hold-down strip is located at the scoreline s3 and provides a surface about which the corresponding corner of the carton may be formed. The carton advances to the roller 460 (similar to roller 458), which sharpens and squares this corner.

When the top wall b4 is folded down upon the flap b7, the adhesive on the inner surface of the top wall engages the flap. The sealing of the top wall and the top flap is ensured by the pressure of the roller 462, which has a cylindrical surface bearing down upon the top wall and a disc flange against the front wall of the carton. The folding and sealing of the flap b7 and the top wall b4, is illustrated in FIGURE 19e, forms the carton into an open-ended tube.

*Trailing End Folder G*

From the folding stage F the carton enters between guide members 492 of a folding stage G shown in FIGURES 14 and 15. This stage includes mechanisms for folding the trailing flaps and trailing end wall of different types of cartons. For the type of carton shown in FIGURE 19, there is a trailing flap b9 extending from the front wall b3, and there is a trailing end wall b6 extending from the rear wall b2. In a modified carton illustrated in FIGURE 20 the flaps b8 and b9 are eliminated, there being instead flaps b12 and b14 extending from the top wall b4.

For the carton of FIGURE 19, folders 494 and 496 are utilized (see FIGURE 15). For the alternate carton of FIGURE 20 the folders 498 and 496 are utilized (see FIGURE 14). Both of folders 494 and 498 are provided, however, in order that the apparatus of the invention may accommodate different types of cartons. All of the folders may remain operative regardless of the type of carton employed, because the unused folders serve as additional pushers for the cartons.

Referring to FIGURE 14, it will be seen that shortly after the pusher 264 enters the folding stage G its chains 230 are guided away from the bed of the machine, gradually withdrawing the pusher 264 from beneath the carton. This is accomplished by inclining downwardly the lower guides 500 for the chains as shown. The chains are driven by drive sprockets 502 on a drive shaft 504.

Each of the folders may comprise a chain or chains having one or more appropriately contoured folding plates extending outwardly from the chains. Thus the folder 494 comprises a chain 506, which passes around sprocket wheels 508 and 510, one of which is driven, and comprises a folding plate 512 mounted on the chain and extending outwardly therefrom. Folder 496 comprises a pair of parallel chains 514, sprocket wheels 516 and 518, and folding plates 520. Folder 498 comprises a chain 522, sprockets 524 and 526, and a folding plate 528. One run of each chain moves along a corresponding longitudinal wall of the carton and is preferably at a slight angle to the carton wall, as shown, so that the folding plate is gradually withdrawn from the carton. This angle may be adjusted, as by mounting the sprocket wheels on a pivotable chassis such as 530 associated with the folder 498. The chassis may turn about the axis of the sprocket wheel 524, an adjusting slot 532 being provided. Sprocket wheel 524 is driven from a shaft 534 having a drive sprocket 536 and a drive chain 538, the drive being typical of the drive for all of the folders of this stage.

Assuming a carton of the type illustrated in FIGURE 19 and referring to FIGURE 19f, as the trailing end of the carton (being advanced by the pusher 264) reaches the folder 494 (FIGURE 15), the folding plate 512 engages the flap $b9$ and folds this flap about scoreline $s8$ and back against the trailing cigarette packs. Then, as plate 512 withdraws (along with pusher 264) the trailing end of the carton reaches the folder 496, and a folding plate 520 folds the trailing end wall $b6$ about scoreline $s5$ and over the flaps $b9$ and $b11$.

The folder 498 (see FIGURE 14) also has its folding plate 528 against the trailing cigarette packs for a short period, but serves merely as a pusher in this instance. If a carton blank of the type shown in FIGURE 20 were employed, the folder 498 would fold down flap $b12$, and folder 494 would serve merely as a pusher.

The folding of the end wall $b6$ over the flaps $b9$ and $b11$ causes the adhesive on the inside of the end wall to adhere to the flaps. The carton with its trailing end thus closed and sealed is advanced by the folder 520 to another conveyor, H.

Conveyor H

This conveyor is shown in FIGURES 16 and 17 and comprises a pair of parallel chains 540, which are supported for movement in horizontal planes. Each chain passes around a large sprocket wheel 542 and a small sprocket wheel 544, one of which is driven in a suitable manner. One run of the chains lies parallel to the path of the advancing cartons. The conveyor has pushers 546 which are supported between the chains. Each pusher comprises a base 548 pivoted at its leading end on the chains at 547 and notched at its trailing end at 549 to engage a stop pin extending between the chains. The base may thus turn inwardly between the chain loops, but its outward movement is limited to the point where the base is parallel to the chains. Each pusher also has a salient arm 550 which extends outwardly from the chains as shown.

When a pusher 546 is moving along the run of the conveyor chains remote from the carton path, it assumes the position illustrated at the left side of FIGURE 16. As the pusher passes about the sprocket wheels 544, the base engages a camming guide 552 and then enters a channel 554. The guide 552 ensures that the pusher enters the channel 554 with the proper orientation, and the channel ensures that the chains 540 move parallel to the path of the carton with the pusher arm 550 held substantially normal to the chains.

A pusher 546 of conveyor H engages the trailing end of a carton before the folder 520 (FIGURES 14 and 15) withdraws completely. After the folder withdraws, the carton is advanced solely by the pusher 546. By this means the carton is advanced to the limit of its longitudinal travel, at which point the pusher 546 withdraws. Since, as will be seen, the carton terminates its longitudinal movement somewhat abruptly, it is necessary to withdraw the pusher 546 quickly. This is accomplished by terminating the guide 552 abruptly at 555, which permits the pusher to flip back about its pivot on the chain as the carton comes to a stop. Guide 552 may be adjustable to adjust the position at which the pusher is released. The pusher then passes around the sprocket wheels 542. As the pusher continues its movement, the trailing end of the base engages a camming guide 556, which is curved to cause the pusher to turn back around its pivot to the position illustrated at the left side of FIGURE 16.

Leading Flap Folder I

At the end of the longitudinal path of the carton there is a leading flap folder I. The particular construction of this folder depends upon the type of carton employed. With a carton of the type illustrated in FIGURE 19, the leading flap folder comprises a pair of folding plates 558 and 560, shown in FIGURES 16 and 17. Folding plate 558 is mounted on an oscillating horizontal shaft 562, and folding plate 560 is mounted on an oscillating vertical shaft 564. The folding plates are biased by weak torsion springs or the like (not shown) to the angular positions illustrated. Referring to FIGURE 19g, when the carton is advanced to the folding stage I, flap $b8$ engages plate 560 and turns into parallelism with the plate. Similarly, flap $b10$ engages plate 558 and turns into parallelism with this plate. Continued advancement of the carton causes the plates 558 and 560 to turn with their shafts until the plates are substantially parallel to the carton leading end, thereby completing the folding of the flaps. When the carton is removed, in a manner to be described, the plates return to the positions illustrated under the bias of their springs.

When a carton of the type illustrated in FIGURE 20 is employed, folders of the type illustrated in FIGURE 18 may be used. In this arrangement the folder plate 558 is maintained, but the folder plate 560 is deleted in favor of a folder plate 566 mounted on another spring-biased horizontal shaft 568. Folder plate 558 operates as before to fold upwardly the flap $b10$. Folder plate 566 operates in a like manner to fold downwardly the flap $b14$.

Final Conveyor J

In passing to the folding stage I, the carton enters the final conveyor J. As shown in FIGURES 16 and 17, this conveyor comprises parallel upper chains 570 and parallel lower chains 572, the chains being arranged in vertical planes. The upper chains 570 pass over sprocket wheels 574, 576, and 578. The lower chains, 572, pass over sprocket wheels 580, 582, and 584. Sprocket wheels 574 and 580 are driven in opposite directions by a chain 586, which passes over idler sprockets 588 and 590 and over a drive sprocket wheel 592. Chain 586, and hence the final conveyor J, is advanced step-by-step by a Geneva gear mechanism 594, the driven part 596 being fixed to the same shaft as the sprocket wheel 592, and the driving part 598 being rotated continuously by its drive shaft. Along one of their flights, the chains 570 and 572 move horizontally in spaced relationship, being backed by guides 600 and 602, respectively. The tension of the chains 570 may be adjusted by mounting the sprocket wheels 578 on a chassis 604 pivotable about the axis of sprocket wheels 576 and provided with an adjusting slot 606.

Chains 570 are bridged by successive pairs of parallel angle members 608 suitably attached to the chain links. Similar pairs of angle bars 608 bridge the chains 572. The phasing of the upper and lower chains is adjusted so that when the chains pass along the guides 600 and 602, the associated angle members of the upper and lower chains form successive rectangular channels 610 in the passageway between the upper and lower chains as shown in FIGURE 17, the channels being dimensioned to fit the cartons.

Referring to the left side of FIGURE 17, it can be seen that the channels are formed just as they move into alignment with the longitudinal path of the cartons, which is terminated at the folding station I. Step-by-step movement of the final conveyor places empty channels in such alignment one-by-one. The timing of the final conveyor with respect to the pushers 546 of conveyor H is adjusted so that an empty channel is made available for the reception of each of the cartons advanced by the pushers. The final conveyor J stops long enough for a carton to be pushed into its channel and into engagement with the folding station I. Then the conveyor advances one step, so as to place an empty channel into alignment with the next carton and so as to advance preceding cartons transversely of the machine.

The tolerances of the channels 610 are made close enough to ensure squaring up of the cartons received within them. One angle member 608 of each pair may be made laterally adjustable to accommodate different size cartons. To permit the insertion of the cartons within their channels without obstruction of the leading flaps and end wall of the cartons by the angle members 608, resilient pressers, such as 612 and 614 in FIGURE 16, may be employed to depress the flaps and end wall slightly. These pressers may comprise inherently resilient strips, such as 614, or strips such as 612 which are made resilient by supporting them on spring biased shafts, such as 616.

The ends of the cartons advanced by the final conveyor J engage guide plates 618 and 620 on opposite sides of the conveyor. These guide plates are resiliently biased toward the carton ends, as by springs 622. The leading extremities of the guide plates are tapered as shown at 624 in FIGURE 16, so as to facilitate the alignment of the cartons. Moreover, the leading extremity of guide plates 620 serves to fold the leading end wall b5 about its scoreline s4 and over flaps b8 and b10, as shown in FIGURE 19h, as the carton enters between plates 618 and 620. During the movement of the cartons with the final conveyor J, the end walls of the cartons are pressed tightly closed, as is the top wall, so as to ensure setting of the adhesive. At the exit of the final conveyor the cartons are released from their channels as the angle members 608 move upwardly and downwardly about the sprocket wheels 574 and 580, respectively, and may be collected in any convenient manner for shipment or storage.

*Interlocks*

FIGURE 21 illustrates a system of interlocks for the machine of the invention. This system includes elements at the blank supply and feed A, the gluer B, and the pack supply and feed D. It will be recalled that the solenoid 76 controls the feeding of the blanks, the solenoid 210 the position of the gluer backing roller, and the solenoid 320 the feeding of the packs. Solenoid 76 is energized from the electric supply lines L through the pack detector switch 276, which is open as long as there is a pack on the conveyor belt 272 under the switch. Solenoids 210 and 320 are energized from the supply lines L by a circuit which includes the switch 220 associated with the blank-sensing bar 212 at the gluer. This switch is open as long as there is a blank at the gluer. The blanks are normally spaced so that one blank reaches the bar 212 before the preceding blank leaves the bar.

When solenoid 76 is energized, the clutch 67 associated with the dog 68 is disengaged so as to terminate blank feed. When solenoid 210 is energized, the backing roller 166 is withdrawn so as to prevent application of glue thereto. When solenoid 320 is energized, the hold-back fingers 288 are locked in their "down" position, so as to prevent the feeding of cigarette packs, the timing being such that fingers 288 are already down when the solenoid is energized.

From the foregoing it will be apparent that when there is no blank at the gluer B, there is no application of glue to the backing roller and there is no feeding of cigarette packs. When there is no pack of cigarettes under the switch 276, there is no feeding of blanks.

Because of the predetermined timing of the components of the machine, when the switch 220 at the gluer closes (indicating the absence of blanks and preventing the feeding of additional packs) there will be sufficient packs at the assembly stage to assemble with the blank which has just left the sensing bar 212. Similarly, when the switch 276 closes (indicating the absence of packs and terminating the feeding of blanks) there will be two blanks in transit, and there will be sufficient packs of cigarettes in the assembly stage to fill these blanks.

*General Operation*

Referring to FIGURE 1, to prepare the machine of the invention for operation, carton blanks are loaded in the magazine of the blank supply A, and cigarette packs are loaded in the magazine of the pack supply D. When the drive system of the machine (e.g., an electric motor) is energized, blanks will be fed in spaced succession from the blank supply to the gluer B. Except for the short pause which occurs before the first chain conveyor c1 engages the blanks, the blanks move substantially continuously from the blank supply to the final conveyor J at the remote end of the machine. At the gluer B, adhesive is applied to the appropriate regions of the blanks. The blanks then enter the transfer section C, where they are transferred from the first chain conveyor c1, to the second chain conveyor c2, which folds the trailing bottom flap and advances the blanks to the assembly stage E. Packs of cigarettes are fed from the supply D to the assembly stage as soon as the first blank reaches the gluing station to release the hold-back fingers of the pack supply. At the assembly stage two rows of five packs each are segregated and assembled with each blank, and the front and rear walls of the carton are folded. Then the partially folded blank supporting the cigarette packs passes to the next folding stage F, at which the top flap and the top wall are folded and sealed, forming a carton tube. The tube is advanced to the next folding stage G, at which the trailing flaps and the trailing end wall are folded and sealed. Then the next conveyor H advances the filled cartons to the next folding stage I, at which the leading flaps are folded. In advancing to this stage the cartons enter the final, transverse conveyor J, and after the folding of the leading flaps, the cartons are advanced by the final conveyor so as to fold and seal the leading end wall and so as to move the finished cartons to the outlet of the machine.

From the foregoing description of the invention it is apparent that the invention provides unique apparatus and methods relating to the forming and filling of cartons and the like. While preferred embodiments of the invention have been shown and described, it will be apparent to those skilled in the art that changes can be made in these embodiments without departing from the principles and spirit of the invention, the scope of which is defined in the appended claims. Modifications can be made in certain components of the over-all machine with or without modification of other parts. For example, within the broader aspects of the invention, the conveyor belts 328 and 330 at the assembly stage may be replaced by stationary tables, or the sweepers 392 may be deleted under certain conditions. Also, the folder 494 may be eliminated, pusher 546 assuming the folding function, and folder 496 may be eliminated, guide portion 624 of guides 618 assuming its function. Accordingly, the foregoing embodiments are to be considered illustrative, rather

The invention claimed is:

1. In a machine for forming cartons and filling them with articles, a supply of carton blanks, conveyor means for advancing successive carton blanks from said supply through said machine continuously, means along the path of said conveyor means for applying adhesive to each blank, an assembly stage along the path of said conveyor means, means for supplying articles to said assembly stage, said assembly stage having means for segregating groups of said articles and means for placing the groups upon successive blanks, and means along the path of said conveyor means for folding said blanks about said articles to form cartons, said folding means comprising means for folding up the sides of the blanks to form corners with the bottom of the blanks and means for folding down the top of the blanks to form the blanks into tubes, said folding means further comprising means for folding trailing flaps of the tubes and means for folding leading flaps of the tubes, the last-mentioned means being located at the end of the path of said conveyor means, and comprising additional conveyor means for advancing filled cartons step-by-step transversely from the first-mentioned conveyor means.

2. In a machine of the type having a supply of carton blanks from which blanks are fed to a gluing stage, at which adhesive is applied thereto, and then to an assembly stage, at which articles fed from an article supply are assembled with the blanks, a system of interlocks, comprising article sensing means associated with the article supply, blank sensing means associated with the gluing stage, means responsive to the condition of the article sensing means for controlling the feeding of blanks from the blank supply, and means responsive to the condition of the blank sensing means for controlling the feeding of articles from the article supply and for controlling the application of glue at the gluing stage.

3. In a packaging machine, apparatus for assembling articles with a carton blank, said apparatus comprising a horizontal conveyor for feeding a series of blanks, an assembling wheel mounted for rotation above said conveyor, said wheel being disposed in a substantially vertical plane, a curved chute adjacent the periphery of said wheel, spaced pusher units carried by the periphery of said wheel and adapted to operate in succession along said chute, a conveyor belt positioned transversely to said wheel above said chute and adapted to convey articles to said chute, a multi-columnar supply source of articles, means for intermittently delivering a group of articles from said supply source to said belt, a plurality of spaced plates mounted eccentrically on a shaft above said belt, said plates lying in planes generally parallel to the plane of said wheel, and means for turning said shaft in timed relation to the operation of said pusher units on said wheel, whereby at predetermrined times said plates are moved to release articles for movement with said belt toward said chute and to drop therein, whereupon said wheel pusher units control the advancement of articles through said chute to a blank.

4. In a packaging machine, apparatus for assembling articles with a carton blank, said apparatus comprising a horizontal conveyor for feeding a series of blanks, an assembling wheel mounted for rotation above said conveyor, said wheel being disposed in a substantially vertical plane, a curved chute adjacent the periphery of said wheel, spaced pusher units carried by the periphery of said wheel and adapted to operate in succession along said chute, a pair of aligned conveyor belts positioned transversely to said wheel on opposite sides thereof above said chute and adapted to convey articles to said chute, a multi-columnar supply source of articles, means for intermittently delivering a group of articles from said supply source to each belt, a plurality of spaced plates mounted above each belt, said plates lying in planes generally parallel to the plane of said wheel, a plurality of hold-back fingers mounted at the exits of the source columns, means for operating said plates and hold-back fingers in timed relation to the pusher units on said wheel, whereby at predetermined times said plates are moved to release articles for movement with said belts toward said chute and to drop therein, whereupon said wheel pusher units control the advancement of articles through said chute to a blank, while said hold-back fingers are to hold back the supply of articles from said columns.

5. In a packaging machine, apparatus for assembling packs with a carton blank, said apparatus comprising a conveyor for feeding a series of carton blanks in succession, an assembling wheel mounted above said conveyor, said wheel being disposed in a substantially vertical plane, a curved chute adjacent the periphery of said wheel, spaced pusher units carried by the periphery of said wheel and adapted to operate in succession along said chute, a pair of supports positioned in alignment above said chute on opposite sides of said wheel and adapted to receive and support packs for movement into said chute, means for intermittently supplying packs to each support, means mounted adjacent each support for intermittently sweeping said packs from said supports and into said chute, means for operating said sweeping means in timed relation to the pusher units on said wheel, whereby at a predetermined time said sweeping means are operated to sweep said packs into said chute whereupon the pusher units on said wheel control the advancement of said packs through said chute to a carbon blank.

6. In a packaging machine, apparatus for assembling packs with a carton blank, said apparatus comprising a conveyor for feeding a series of carton blanks in succession, an assembling wheel mounted above said conveyor, said wheel being disposed in a substantially vertical plane, a curved chute adjacent the periphery of said wheel, spaced pusher units carried by the periphery of said wheel and adapted to operate in succession along said chute, a pair of conveyor belts positioned in alignment above said chute on opposite sides of said wheel and adapted to receive and support packs for movement into said chute, means for intermittently supplying packs to each belt, means mounted adjacent each belt for intermittently sweeping said packs from said belts and into said chute, means for operating said sweeping means at a faster speed than the speed of said belts and in timed relation to the pusher units on said wheel, whereby at a predetermined time said sweeping means are operated to sweep said packs from said belts and into said chute whereupon the pusher units on said wheel control the advancement of said packs through said chute to a carton blank.

7. In a packaging machine, apparatus for assembling packs with a carton blank, said apparatus comprising a conveyor for feeding a series of carton blanks in succession, an assembling wheel mounted above said conveyor, said wheel being disposed in a substantially vertical plane, a curved chute adjacent the periphery of said wheel, spaced pusher units carried by the periphery of said wheel and adapted to operate in succession along said chute, supporting means positioned above said chute and adapted to receive and support packs for movement into said chute, means for intermittently supplying packs to said supporting means, means mounted adjacent said supporting means for intermittently sweeping said packs therefrom into said chute, means for operating said sweeping means in timed relation to the pusher units on said wheel, whereby at a predetermined time said sweeping means is operated to sweep said packs into said chute whereupon the pusher units on said wheel control the advancement of said packs through said chute to a carton blank.

8. The method of packaging packs in cartons, which comprises the steps of continuously feeding a series of carton blanks from a supply thereof along an assembly line, feeding a plurality of packs in adjacent columns, separating and holding a group of packs from said columns of packs while blocking the remaining packs, releasing said group of packs for movement by gravity along a curved path toward said assembly line of carton blanks, pushing said group of packs to place same in standing position upon a carton blank, folding up the sides of each blank about said group of packs, folding down the top of each blank upon said groups of packs to form said carton into a tube, and finally closing the ends of said carton to completely enclose said packs therein.

9. A method of arranging rectangular articles in two adjacent rows with corresponding articles of the rows standing face-to-face, which comprises feeding the articles in columns, segregating articles from said columns at a first level, one article from each column, to form a pair of aligned rows with the articles lying face-up, advancing the aligned rows toward each other, moving said rows downwardly and into parallelism along adjacent curved paths with terminate at a second level, and then moving said rows in parallelism along said second level with said articles standing.

10. In the packaging art, a method of assembling articles in side-by-side rows upon a carton blank, which comprises moving carton blanks in succession at a first level in alignment with the median plane of an assembly station, forming rows of articles transverse to and on opposite sides of said median plane at a second level, moving the articles of said rows toward the median plane, and then moving the articles of said rows from said second level to said first level along curved paths substantially parallel to the median plane on opposite sides thereof, and then onto corresponding blanks.

References Cited in the file of this patent

UNITED STATES PATENTS

| | | |
|---|---|---|
| 2,095,258 | Kimball | Oct. 12, 1937 |
| 2,197,135 | Schulze | Apr. 16, 1940 |
| 2,277,408 | Molins | Mar. 24, 1942 |
| 2,305,130 | Banta | Dec. 15, 1942 |
| 2,615,289 | Hickin | Oct. 28, 1952 |
| 2,625,778 | Wood | Jan. 20, 1953 |
| 2,633,280 | Davies | Mar. 31, 1953 |
| 2,669,076 | Ormby | Feb. 16, 1954 |
| 2,762,274 | Kerr | Sept. 11, 1956 |
| 2,764,123 | Derderian | Sept. 25, 1956 |
| 2,764,409 | Bombard | Sept. 25, 1956 |
| 2,784,966 | Roach | Mar. 12, 1957 |
| 2,873,717 | Griffin | Feb. 17, 1959 |
| 2,916,137 | Hume | Dec. 8, 1959 |
| 2,919,526 | Arneson | Jan. 5, 1960 |